(12) United States Patent
Grant

(10) Patent No.: US 7,283,120 B2
(45) Date of Patent: Oct. 16, 2007

(54) METHOD AND APPARATUS FOR PROVIDING HAPTIC FEEDBACK HAVING A POSITION-BASED COMPONENT AND A PREDETERMINED TIME-BASED COMPONENT

(75) Inventor: Danny Grant, Montreal (CA)

(73) Assignee: Immersion Corporation, San Jose, CA (US)

( * ) Notice: Subject to any disclaimer, the term of this patent is extended or adjusted under 35 U.S.C. 154(b) by 95 days.

(21) Appl. No.: 10/758,599

(22) Filed: Jan. 16, 2004

(65) Prior Publication Data

US 2005/0156892 A1   Jul. 21, 2005

(51) Int. Cl.
G09G 5/00 (2006.01)
G06F 3/033 (2006.01)

(52) U.S. Cl. .................. 345/156; 345/184; 345/168; 345/161; 345/160; 345/167; 200/5 R

(58) Field of Classification Search ........ 345/156–169, 345/184; 273/148 B; 463/37–38; 341/34; 200/5 R
See application file for complete search history.

(56) References Cited

U.S. PATENT DOCUMENTS

| | | |
|---|---|---|
| 2,972,140 A | 2/1961 | Hirsch |
| 3,157,853 A | 11/1964 | Hirsch |
| 3,220,121 A | 11/1965 | Cutler |
| 3,497,668 A | 2/1970 | Hirsch |
| 3,517,446 A | 6/1970 | Corlyon et al. |
| 3,623,064 A | 11/1971 | Kagan |
| 3,902,687 A | 9/1975 | Hightower |
| 3,903,614 A | 9/1975 | Diamond et al. |
| 3,911,416 A | 10/1975 | Feder |
| 3,919,691 A | 11/1975 | Noll |
| 4,127,752 A | 11/1978 | Lowthorp |
| 4,160,508 A | 7/1979 | Salisbury |
| 4,236,325 A | 12/1980 | Hall et al. |
| 4,262,549 A | 4/1981 | Schwellenbach |
| 4,333,070 A | 6/1982 | Barnes |
| 4,464,117 A | 8/1984 | Foerst |
| 4,484,191 A | 11/1984 | Vavra |
| 4,513,235 A | 4/1985 | Acklam et al. |
| 4,581,491 A | 4/1986 | Boothroyd |
| 4,599,070 A | 7/1986 | Hladky et al. |

(Continued)

FOREIGN PATENT DOCUMENTS

EP   0 265 011 A1   4/1988

(Continued)

OTHER PUBLICATIONS

International Search Report for International Application No. PCT/US04/34337 mailed on Nov. 15, 2005.

(Continued)

Primary Examiner—Lun-Yi Lao
(74) Attorney, Agent, or Firm—Thelen Reid Brown Raysman & Steiner LLP

(57) ABSTRACT

A manipulandum includes a sensor and an actuator. The sensor is configured to output a position signal when the manipulandum is moved from the first position to the second position. Additionally, the actuator is configured to output haptic feedback having a position-based component and a predetermined time-based component.

23 Claims, 15 Drawing Sheets

U.S. PATENT DOCUMENTS

| | | |
|---|---|---|
| 4,708,656 A | 11/1987 | De Vries et al. |
| 4,713,007 A | 12/1987 | Alban |
| 4,787,051 A | 11/1988 | Olson |
| 4,794,392 A | 12/1988 | Selinko |
| 4,795,296 A | 1/1989 | Jau |
| 4,868,549 A | 9/1989 | Affinito et al. |
| 4,885,565 A | 12/1989 | Embach |
| 4,891,764 A | 1/1990 | McIntosh |
| 4,896,554 A | 1/1990 | Culver |
| 4,930,770 A | 6/1990 | Baker |
| 4,934,694 A | 6/1990 | McIntosh |
| 4,949,119 A | 8/1990 | Moncrief et al. |
| 5,019,761 A | 5/1991 | Kraft |
| 5,022,384 A | 6/1991 | Freels |
| 5,022,407 A | 6/1991 | Horch et al. |
| 5,035,242 A | 7/1991 | Franklin |
| 5,038,089 A | 8/1991 | Szakaly |
| 5,044,956 A | 9/1991 | Behensky et al. |
| 5,078,152 A | 1/1992 | Bond |
| 5,107,262 A | 4/1992 | Cadoz et al. |
| 5,146,566 A | 9/1992 | Hollis, Jr. et al. |
| 5,165,897 A | 11/1992 | Johnson |
| 5,175,459 A | 12/1992 | Danial et al. |
| 5,184,319 A | 2/1993 | Kramer |
| 5,185,561 A | 2/1993 | Good et al. |
| 5,186,629 A | 2/1993 | Rohen |
| 5,186,695 A | 2/1993 | Mangseth et al. |
| 5,203,563 A | 4/1993 | Loper, III |
| 5,212,473 A | 5/1993 | Louis |
| 5,220,260 A | 6/1993 | Schuler |
| 5,240,417 A | 8/1993 | Smithson et al. |
| 5,271,290 A | 12/1993 | Fischer |
| 5,275,174 A | 1/1994 | Cook |
| 5,283,970 A | 2/1994 | Aigner |
| 5,296,871 A | 3/1994 | Paley |
| 5,299,810 A | 4/1994 | Pierce |
| 5,309,140 A | 5/1994 | Everett |
| 5,334,027 A | 8/1994 | Wherlock |
| 5,355,148 A | 10/1994 | Anderson |
| 5,374,942 A * | 12/1994 | Gilligan et al. ............. 345/157 |
| 5,388,992 A | 2/1995 | Franklin et al. |
| 5,399,091 A | 3/1995 | Mitsumoto |
| 5,405,152 A | 4/1995 | Katanics et al. |
| 5,414,337 A | 5/1995 | Schuler |
| 5,436,622 A | 7/1995 | Gutman et al. |
| 5,437,607 A | 8/1995 | Taylor |
| 5,451,924 A | 9/1995 | Massimino et al. |
| 5,466,213 A | 11/1995 | Hogan |
| 5,506,605 A | 4/1996 | Paley |
| 5,542,672 A | 8/1996 | Meredith |
| 5,547,382 A | 8/1996 | Yamasaki |
| 5,550,562 A | 8/1996 | Aoki et al. |
| 5,565,840 A | 10/1996 | Thorner et al. |
| 5,575,761 A | 11/1996 | Hajianpour |
| 5,583,478 A | 12/1996 | Renzi |
| 5,589,828 A | 12/1996 | Armstrong |
| 5,589,854 A | 12/1996 | Tsai |
| 5,625,576 A | 4/1997 | Massie et al. |
| 5,629,594 A | 5/1997 | Jacobus et al. |
| 5,643,087 A | 7/1997 | Marcus et al. |
| 5,666,138 A | 9/1997 | Culver |
| 5,684,722 A | 11/1997 | Thorner et al. |
| 5,690,582 A | 11/1997 | Ulrich et al. |
| 5,696,537 A | 12/1997 | Solhjell |
| 5,709,219 A | 1/1998 | Chen et al. |
| 5,714,978 A | 2/1998 | Yamanaka et al. |
| 5,734,373 A | 3/1998 | Rosenberg et al. |
| 5,736,978 A | 4/1998 | Hasser et al. |
| 5,742,278 A | 4/1998 | Chen et al. |
| 5,754,023 A | 5/1998 | Roston et al. |
| 5,766,016 A | 6/1998 | Sinclair |
| 5,781,172 A | 7/1998 | Engel et al. |
| 5,784,052 A | 7/1998 | Keyson |
| 5,785,630 A | 7/1998 | Bobick et al. |
| 5,790,108 A | 8/1998 | Salcudean et al. |
| 5,802,353 A | 9/1998 | Avila et al. |
| 5,825,308 A | 10/1998 | Rosenberg |
| 5,844,392 A | 12/1998 | Peurach et al. |
| 5,857,986 A | 1/1999 | Moriyasu |
| 5,880,714 A | 3/1999 | Rosenberg et al. |
| 5,889,672 A | 3/1999 | Schuler et al. |
| 5,897,437 A | 4/1999 | Nishiumi et al. |
| 5,912,661 A | 6/1999 | Siddiqui |
| 5,914,705 A | 6/1999 | Johnson et al. |
| 5,944,151 A | 8/1999 | Jakobs et al. |
| 5,956,484 A | 9/1999 | Rosenberg et al. |
| 5,959,613 A | 9/1999 | Rosenberg et al. |
| 5,973,689 A | 10/1999 | Gallery |
| 5,986,643 A | 11/1999 | Harvill et al. |
| 5,990,869 A | 11/1999 | Kubica et al. |
| 6,001,014 A | 12/1999 | Ogata et al. |
| 6,004,134 A | 12/1999 | Marcus et al. |
| 6,005,551 A | 12/1999 | Osborne et al. |
| 6,020,876 A | 2/2000 | Rosenberg et al. |
| 6,028,593 A | 2/2000 | Rosenberg et al. |
| 6,061,004 A | 5/2000 | Rosenberg |
| 6,078,308 A | 6/2000 | Rosenberg et al. |
| 6,088,017 A | 7/2000 | Tremblay et al. |
| 6,088,019 A | 7/2000 | Rosenberg |
| 6,100,874 A | 8/2000 | Schena et al. |
| 6,111,577 A | 8/2000 | Zilles et al. |
| 6,128,006 A | 10/2000 | Rosenberg et al. |
| 6,154,201 A | 11/2000 | Levin et al. |
| 6,160,489 A | 12/2000 | Perry et al. |
| 6,184,868 B1 | 2/2001 | Shahoian et al. |
| 6,211,861 B1 | 4/2001 | Rosenberg et al. |
| 6,219,034 B1 | 4/2001 | Elbing et al. |
| 6,243,078 B1 | 6/2001 | Rosenberg |
| 6,271,833 B1 | 8/2001 | Rosenberg |
| 6,422,941 B1 | 7/2002 | Thorner et al. |
| 6,448,977 B1 | 9/2002 | Braun et al. |
| 6,469,692 B2 | 10/2002 | Rosenberg |
| 6,563,487 B2 | 5/2003 | Martin et al. |

FOREIGN PATENT DOCUMENTS

| | | |
|---|---|---|
| EP | 0349086 | 1/1990 |
| EP | 0 607 580 A1 | 7/1994 |
| EP | 0 626 634 A2 | 11/1994 |
| JP | H2-185278 | 7/1990 |
| JP | H4-8381 | 1/1992 |
| JP | H5-192449 | 8/1993 |
| JP | H7-24147 | 1/1995 |
| WO | WO 92/00559 | 1/1992 |
| WO | WO 95/20788 | 8/1995 |
| WO | WO 97/31333 | 8/1997 |
| WO | WO 00/03319 | 1/2000 |

OTHER PUBLICATIONS

Baigrie, "Electric Control Loading—A Low Cost, High Performance Alternative," *Proceedings of Interservice/Industry Training Systems Conference*, pp. 247-254, Nov. 6-8, 1990.

Iwata, "Pen-based Haptic Virtual Environment," 0-7803-1363-1/93 IEEE, pp. 287-292, 1993.

Russo, "The Design and Implementation of a Three Degree of Freedom Force Output Joystick," MIT Libraries Archives, pp. 1-131, May 1990, archived Aug. 14, 1990.

Brooks et al., "Hand Controllers for Teleoperation—A State-of-the-Art Technology Survey and Evaluation," JPL Publication 85-11; NASA-CR-175890; N85-28559, pp. 1-84, Mar. 1, 1985.

Jones et al., "A perceptual analysis of stiffness," ISSN 0014-4819 Springer International (Springer-Verlag): *Experimental Brain Research*, vol. 79, No. 1, pp. 150-156, 1990.

Burdea et al., "Distributed Virtual Force Feedback, Lecture Notes for Workshop on Force Display in Virtual Environments and its Application to Robotic Teleoperation," *1993 IEEE International Conference on Robotics and Automation*, pp. 25-44, May 2, 1993.

Snow et al., "Model-X Force-Reflecting-Hand-Controller," NT Control No. NPO-17851; JPL Case No. 7348, pp. 1-4, with 45 pages of attachments, Jun. 15, 1989.

Ouh-Young, "Force Display in Molecular Docking," Doctoral Dissertation, University of Norh Carolina at Chapel Hill, UMI Order No. 9034744, pp. 1-369, 1990.

Tadros, Control System Design for a Three Degree of Freedom Virtual Environment Simulator Using Motor/Brake Pair Actuators, *MIT Archive*, pp. 1-88, Feb. 1990, archived Aug. 13, 1990.

Caldwell et al., "Enhanced Tactile Feedback (Tele-Taction) Using a Multi-Functional Sensory System," 1050-4729/93, pp. 955-960, 1993.

Adelstein, "Design and Implementation of a Force Reflecting Manipulandum for Manual Control research," DSC- vol. 42, *Advances in Robotics*, pp. 1-12, 1992.

Gotow et al., "Controlled Impedance Test Apparatus for Studying Human Interpretation of Kinesthetic Feedback," WA11-11:00, pp. 332-337.

Stanley et al., "Computer Simulation of Interacting Dynamic Mechanical Systems Using Distributed Memory Parallel Processors," DSC-vol. 42, *Advances in Robotics*, pp. 55-61, ASME 1992.

Russo, "Controlling Dissipative Magnetic Particle Brakes in Force Reflective Devices," DSC-vol. 42 *Advances in Robotics*, pp. 63-70, ASME 1992.

Kontarinis et al., "Display of High-Frequency Tactile Information to Teleoperators," *Telemanipulator Technology and Space Telerobotics*, Won S. Kim, Editor, Proc. SPIE vol. 2057, pp. 40-50, Sep. 7-9, 1993.

Patrick et al., "Design and Testing of A Non-reactive, Fingertip, Tactile Display for Interaction with Remote Environments," *Cooperative Intelligent Robotics in Space*, Rui J. deFlgueiredo et al., Editor, Proc. SPIE vol. 1387, pp. 215-222, 1990.

Adelstein, "A Virtual Environment System For the Study of Human Arm Tremor," *Ph.D. Dissertation*, Dept of Mechanical Engineering, MIT, Jun. 1989, Archived Mar. 13, 1990.

Bejczy, "Sensors, Controls, and Man-Machine Interface for Advanced Teleoperation," Science, vol. 208, No. 4450, pp. 1327-1335, 1980.

Bejczy et al., "Generalization of Bilateral Force-Reflecting Control of Manipulators," *Proceedings Of Fourth CISM-IFToMM*, Sep. 8-12, 1981.

Mcaffee, "Teleoperator Subsystem/Telerobot Demonsdtrator: Force Reflecting Hand Contoller Equipment Manual," *JPL* D-5172, Jan. 1988.

Minsky, "Computational Haptics: The Sandpaper System for Synthesizing Texture for a Force-Feedback Display," *Ph.D. Dissertation*, MIT, Jun. 1995, archived Jul. 6, 1995.

Jacobsen et al., "High Performance, Dextrous Telerobotic Manipulator With Force Reflection," *Intervention/ROV '91 Conference & Exposition*, Hollywood, Florida, May 21-23, 1991.

Shimoga, "Finger Force and Touch Feedback Issues in Dexterous Telemanipulation," *Proceedings of Fourth Annual Conference on Intelligent Robotic Systems for Space Exploration*, Renssalaer Polytechnic Institute, Sep. 30-Oct. 1, 1992.

IBM Technical Disclosure Bulletin, "Mouse Ball-Actuating Device With Force and Tactile Feedback," vol. 32, No. 9B, Feb. 1990.

Terry et al., "Tactile Feedback In A Computer Mouse," *Proceedings of Fouteenth Annual Northeast Bioengineering Conference*, University of New Hampshire, Mar. 10-11, 1988.

Howe, "A Force-Reflecting Teleoperated Hand System for the Study of Tactile Sensing in Precision Manipulation," *Proceedings of the 1992 IEEE International Conference on Robotics and Automation*, Nice, France, May 1992.

Eberhardt et al., "OMAR—A Haptic display for speech perception by deaf and deaf-blind Individuals," *IEEE Virtual Reality Annual International Symposium*, Seattle, WA, Sep. 18-22, 1993.

Rabinowitz et al., "Multidimensional tactile displays: Identification of vibratory intensity, frequency, and contactor area," *Journal of The Acoustical Society of America*, vol. 82, No. 4, Oct. 1987.

Bejczy et al., "Kinesthetic Coupling Between Operator and Remote Manipulator," *International Computer Technology Conference, The American Society of Mechanical Engineers*, San Francisco, CA, Aug. 12-15, 1980.

Bejczy et al., "A Laboratory Breadboard System For Dual-Arm Teleoperation," *SOAR '89 Workshop*, JSC, Houston, TX, Jul. 25-27, 1989.

Ouh-Young, "A Low-Cost Force Feedback Joystick and Its Use In PC Video Games," *IEEE Transactions on Consumer Electronics*, vol. 41, No. 3, Aug. 1995.

Marcus, "Touch Feedback in Surgery," *Proceedings of Virtual Reality and Medicine The Cutting Edge*, Sep. 8-11, 1994.

Bejczy, et al., "Universal Computer Control System (UCCS) For Space Telerobots," CH2413-3/87/0000/0318501.00 1987 IEEE, 1987.

Patrick, "Design, Construction, and Testing of a Fingertip Tactile Display for Interaction with Virtual and Remote Environments," *Master of Science Thesis*, MIT, Aug. 1990, archived Nov. 8, 1990.

Calder, "Design of A Force-Feedback Touch-Introducing Actuator For Teleoperator Robot Control," *Bachelor of Science Thesis*, MIT, May 1983, archived Jun. 23, 1983.

Wiker, "Teletouch Display Development: Phase 1 Report," *Technical Report 1230, Naval Ocean Systems Center*, San Diego, Jul. 1988.

Bliss, "Optical-to-Tactile Image Conversion for the Blind," *IEEE Transactions on Man-Machine Systems*, vol. MMS-11, No. 1, Mar. 1970.

Johnson, "Shape-Memory Alloy Tactile Feedback Actuator," *Armstrong Aerospace Medical Research Laboratory*, AAMRL-TR-90-039, Aug. 1990.

Kontarinis et al., "Tactile Display of Vibratory Information In Teleoperation and Virtual Environments," PRESENCE, 4(4):387-402, Harvard Univ., 1995.

Aukstakalnis et al., "Silicon Mirage: The Art and Science of Virtual Reality," ISBN 0-938151-82-7, pp. 129-180, 1992.

Eberhardt et al., "Inducing Dynamic Haptic Perception by The Hand: System Description and Some Results," DSC-vol. 55-1, *Dynamic Systems and Control*:vol. 1, ASME 1994.

Gobel et al., "Tactile Feedback Applied to Computer Mice," *International Journal of Human-Computer Interaction*, vol. 7, No. 1, pp. 1-24, 1995.

Pimentel et al., "Virtual Reality: through the new looking glass," 2nd Edition; McGraw-Hill, ISBN 0-07-050167-X, pp. 41-202, 1994.

"Cyberman Technical Specification," *Logitech Cyberman SWIFT Supplement to Logitech Mouse Technical Reference and Programming Guide*, Apr. 5, 1994.

Ouhyoung et al., "The Development of A Low-Cost Force Feedback Joystick and its Use in the Virtual Reality Environment," *Proceedings of the Third Pacific Conference on Computer Graphics and Applications, Pacific Graphics '95*, Seoul, Korea, Aug. 21-24, 1995.

Kaczmarek et al., "Tactile Displays," *Virtual Environment Technologies*, Chap. 9, pp. 349-414.

Lake, "Cyberman from Logitech," at http://www.ibiblio.org/GameBytes/Issue21/greviews/cyberman.html, 1994.

"Component Maintenance Manual With Illustrated Parts List, Coaxial Control Shaker Part No. C-25502," Safe Flight Instrument Corporation, Revised Jan. 28, 2002 (3 pages).

"Technical Manual Overhaul Instructions With Parts Breakdown, Coaxial Control Shaker Part No. C-25502," Safe Flight Instrument Corporation, Revised Jul. 15, 1980 (23 pages).

Scannell, "Taking a Joystick Ride," *Computer Currents*, Boston Edition, vol. 9, No. 11, Nov. 1994.

Yamakita et al., "Tele-Virtual Reality of Dynamic Mechanical Model," *Proceedings of the 1992 IEEE/RSJ International Conference on Intelligent Robots and Systems*, Raleigh, NC, Jul. 7-10, 1992.

Noll, "Man-Machine Tactile," *SID Journal*Jul./Aug. 1972 Issue.

Rosenberg, "Virtual Fixtures: Perceptual Overlays Enhance Operator Performance In Telepresence Tasks," *Ph.D Dissertation*, Stanford University, Jun. 1994.

Buttolo et al., "Pen-Based Force Display for Precision Manipulation in Virtual Environments," 0-8186-7084 IEEE Mar. 1995, pp. 217-224.

Schmult et al., "Application Areas for A Force-Feedback Joystick," DSC-vol. 49, Advances in Robotics, Mechatronics, and Haptic Interfaces, ASME 1993, pp. 47-54.

Ellis et al., "Design and Evaluation of a High-Performance Prototype Planar Haptic Interface," DSC-vol. 49, Advances in Robotics, Mechatronics, and Haptic Interfaces, ASME Dec. 1993, pp. 55-65.

Hannaford et al., "Force-Feedback Cursor Control," NASA Tech Brief, vol. 13, No. 11, Item #21, Jet Propulsion Lab., Nov. 1989.

Kelley et al., "On the Development of a Force-Feedback Mouse and Its Integration Into a Graphical User Interface," Symp. on Haptic Interfaces for Virtual Envir. and Teleoperator Systems, 1994 Int'l Mech. Eng. Congress and Exhibition, Nov. 1994.

Iwata, J., "Artificial Reality with Force-Feedback: Development of Desktop Virtual Space with Compact Master Manipulator," Computer Graphics, vol. 24, No. 4, Aug. 1990, pp. 165-170.

Ramstein et al., "The Pantograph: A Large Workshop Haptic Device for a Multimodal Human-Computer Interaction," Computer-Human Interaction, CHI'94.

Rosenberg et al., "Commercially Viable Force Feedback Controller for Individuals with Neuromotor Disabilities," USAF Armstrong Lab., May 1996.

Su et al., "The Virtual Panel Architecture: A 3D Gesture Framework," Computer Science Depts., Univ. of Maryland, Texas A&M Univ., Jan. 1993.

Adachi et al., "Sensory Evaluation of Virtual Haptic Push-Button," Technical Research Center, Suzuki Motor Corp., 1994.

Rosenberg, L., "A Force Feedback Programming Primer-For PC Gaming Peripherals Supporting I-Force 2.0 and Direct-X 5.0," Immersion Corporation, 1997.

Hasser, C., "Tactile Feedback For a Force-Reflecting Haptic Display," School of Engineering, Univ. of Dayton, Dec. 1995.

Hasser, C. et al., "Tactile Feedback With Adaptive Controller for a Force-Reflecting Haptic Display—Part 1: Design," IEEE 0-7803-3131, Jan. 1996.

Dennerlein, Jack T. et al., "Vibrotactile Feedback for Industrial Telemanipulators," 6.sup.th Ann. Symposium on Haptic Interfaces for Virtual Environment and Teleoperator Systems, ASME IMECE, Nov. 1997.

Akamatsu, M. et al., "Multimodal Mouse: A Mouse-Type Device With Tactile and Force Display," Presence, vol. 3, No. 4, Winter 1994, pp. 73-80.

Kelley, A.J. et al., "MagicMouse: Tactile and Kinesthetic Feedback in the Human-Computer Interface Using an Electromagnetically Actuated Input/Output Device," Dept. of Elec. Eng., Univ. of British Columbia, Oct. 1993, pp. 1-27.

Ramstein, C., "Combining Haptic and Braille Technologies: Design Issues and Pilot Study." ACM 0-89791-776 Jun. 1996, pp. 37-44.

Payette, J. et al., "Evaluation of a Force Feedback (Haptic) Computer Pointing Device in Zero Gravity," DSC-vol. 58, Proc. of ASME Dynamics Systems and Control Division, ASME 1996, pp. 547-553.

Wiker, S. et al., "Development of Tactile Mice for Blind Access to Computers: Importance of Stimulation Locus, Object Size, and Vibrotactile Display Resolution," Proc. Human Factors Society 35.sup.th Annual Meeting 1991, pp. 708-712.

* cited by examiner

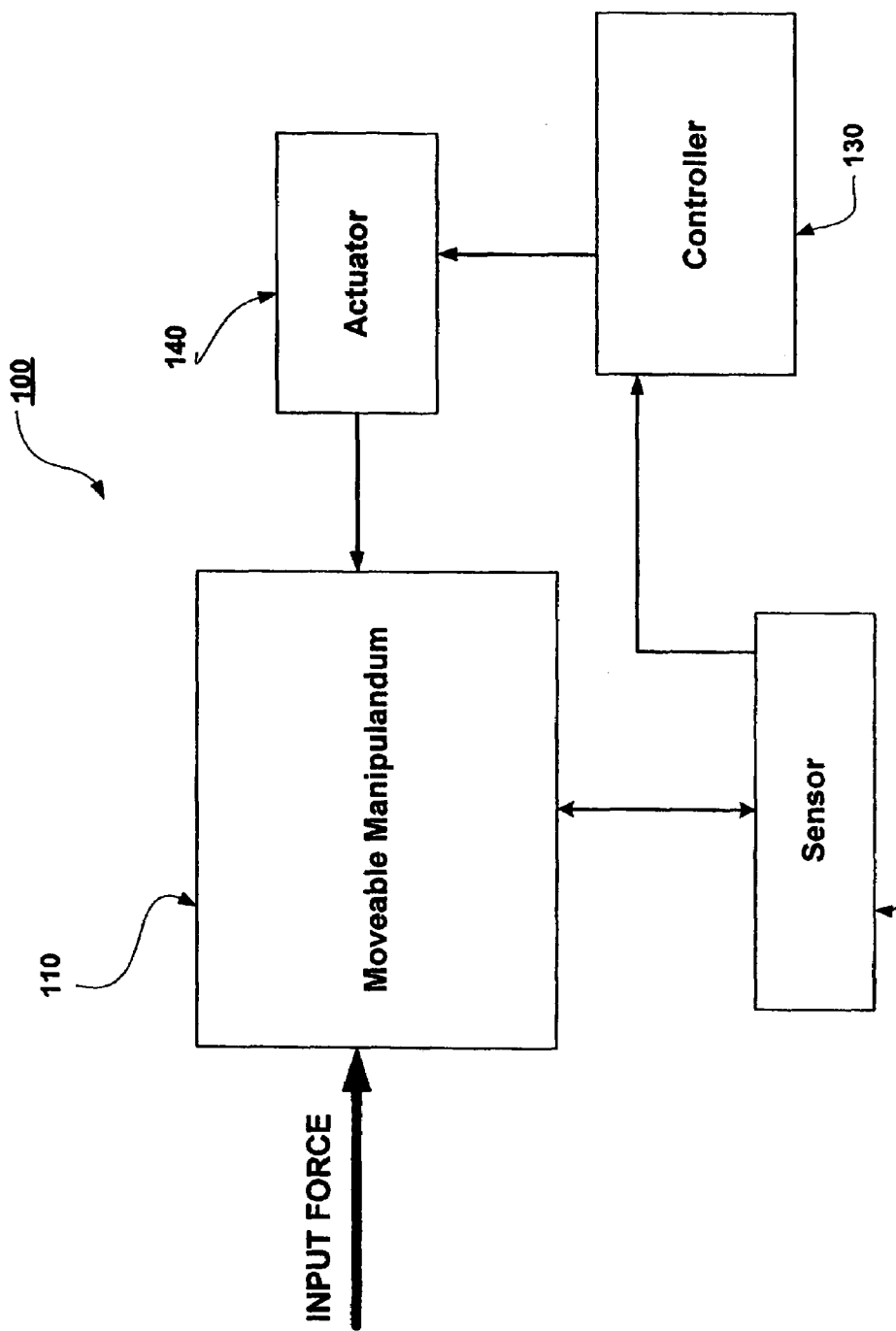

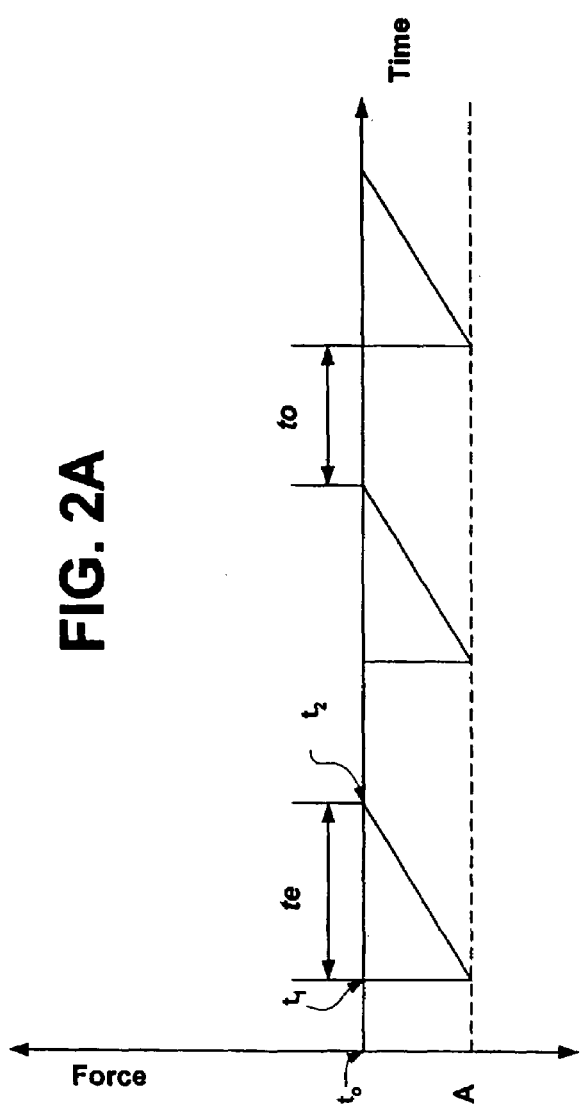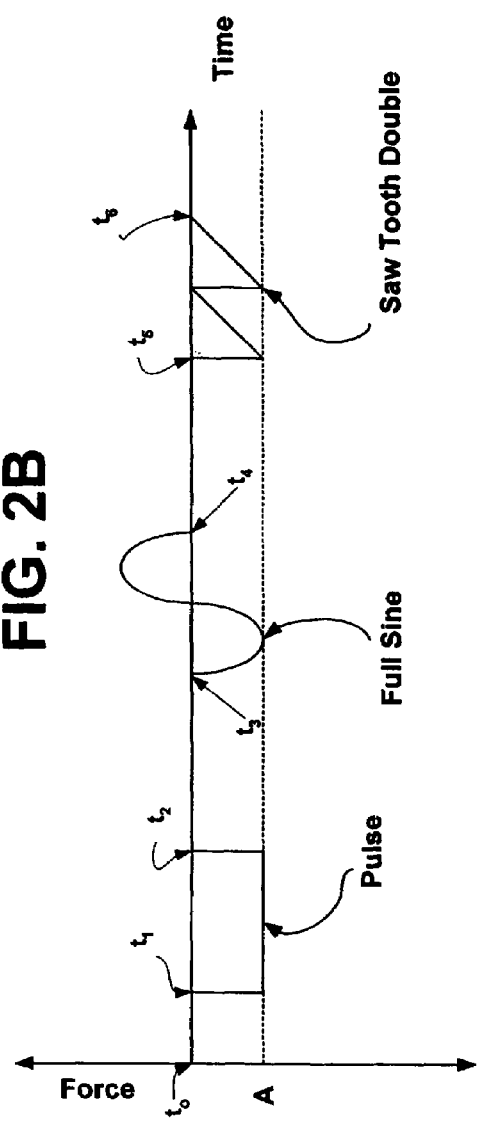

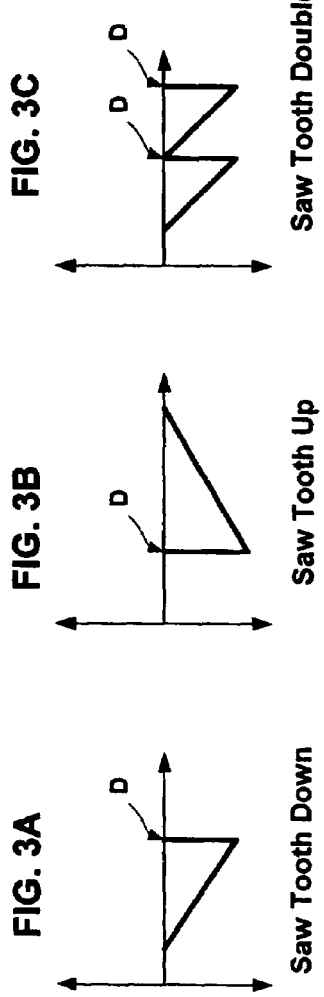

METHOD AND APPARATUS FOR PROVIDING HAPTIC FEEDBACK HAVING A POSITION-BASED COMPONENT AND A PREDETERMINED TIME-BASED COMPONENT

BACKGROUND OF THE INVENTION

The invention relates generally to the control of haptic feedback in a manipulandum. More particularly, the invention relates to the control of haptic feedback in, for example, buttons or knobs.

In general, a button that is part of a system for generating tactile or haptic feedback to a user can be programmed with different force profiles to be output at the button. A haptic button may be programmed to have a variety of different "feels" depending on any number of variables, such as the state of the interface, the process to be controlled, and the number of positions in which the button can be moved.

In one known approach for implementing a haptic button, an active element (for example a direct-current (DC) motor) generates haptic feedback based on a detected motion of the button. This is a closed-loop type of feedback, because the haptic feedback output to a user is based solely on a position signal output from a sensor.

A need exists for a haptic button or knob system of reduced size relative to known devices. Additionally, a need exists for a system that produces haptic feedback to a manipulandum that enhances the mechanical "feel" of the manipulandum. Additional benefits may be realized using the methods and apparatus disclosed herein.

SUMMARY OF THE INVENTION

A manipulandum includes a sensor and an actuator. The sensor is configured to output a position signal when the manipulandum is moved from the first position to the second position. Additionally, the actuator is configured to output haptic feedback having a position-based component and a predetermined time-based component.

BRIEF DESCRIPTION OF THE DRAWINGS

FIG. 1A is a functional block diagram illustrating a control device according to one aspect of the invention.

FIG. 2A is a graphical representation of exemplary force feedback profiles output from a device according to an embodiment of the invention.

FIG. 2B is another graphical representation of various predetermined time-based waveforms that may be output using a device according to other embodiments of the invention.

FIGS. 3A-3I are graphical representations of predetermined time-based waveform component profiles that may be output from a manipulandum.

DETAILED DESCRIPTION

Figure 1B:
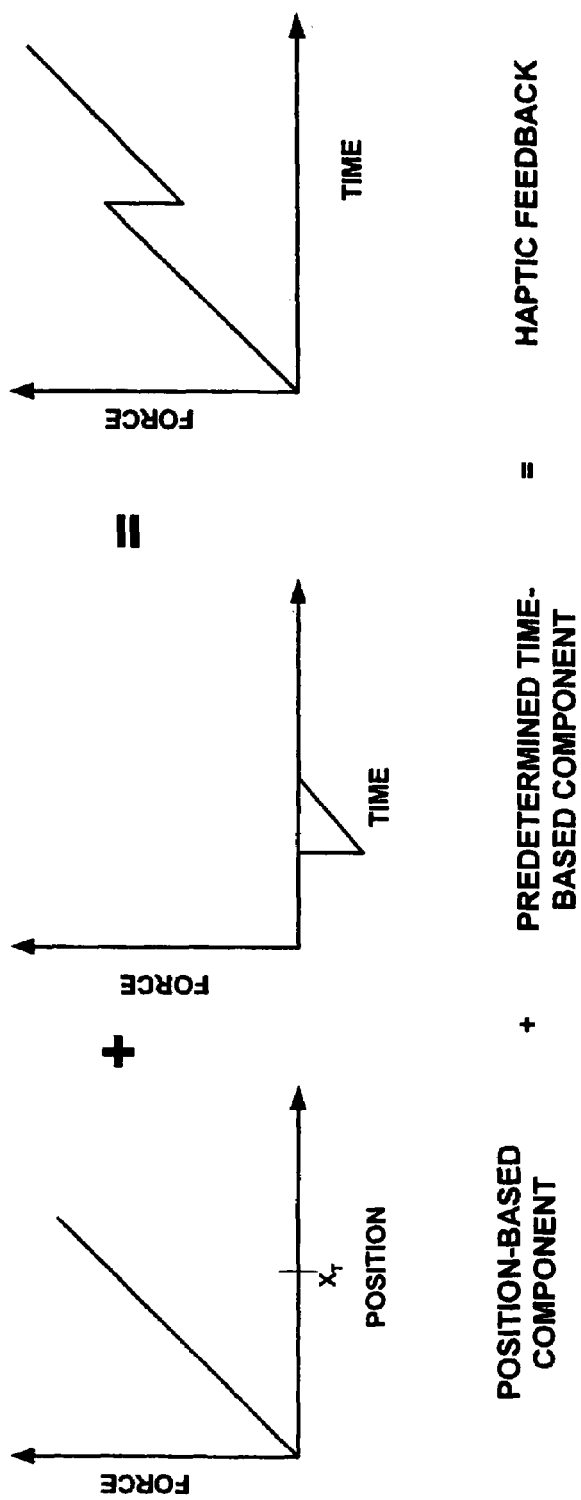
FIG. 1B illustrates the combination of a position-based component with a predetermined time-based component to produce haptic feedback.

A method and apparatus is described for producing haptic feedback via a manipulandum such as knobs and buttons using predetermined waveforms having a position-based component and a time-based component. A manipulandum includes any structure that is configured to be contacted and moved by a user. Manipulandums can include, for example, buttons, switches, knobs, trackballs, joysticks, and multiple degree of freedom haptic devices.

Haptic feedback including haptic feedback having a predetermined time-based component can correspond to any waveform having a position-based component and a predetermined time-based component. The predetermined time-based component can be based on a predefined waveform that is output as a function of time (i.e., defined before it is output). A predetermined time-based component, for example, can be stored in a processor-readable medium for retrieval by a microprocessor or other controller. For example, a predetermined time-based component can be a pulse waveform that has a maximum force "A" and a duration of 75 ms. This waveform may be stored in, for example, a memory and retrieved by a controller when the controller receives an indication that the manipulandum is in a threshold position.

The position-based component can include, for example, a base-line waveform. In one embodiment, the position-based component can be a physical or a virtual spring force. In an alternative embodiment, the position-based component can be a sinusoidal detent profile. Any base-line waveform in which the output force is a function of the position of a manipulandum may be used as the position-based component.

Unlike an approach of implementing a haptic button including a closed-loop feedback system, where, for example, the magnitude of haptic feedback being output is based solely on the position of the manipulandum, a predetermined time-based component may be stored in a processor-readable medium and may be accessed by the controller for either single-shot output, or continuous output, as will be described in more detail below. The predetermined time-based component can be output as haptic feedback in conjunction with the position-based haptic feedback.

The term "waveform" connotes a mathematical or graphical representation of a wave, pulse or transition of force values over a displacement of a manipulandum. For example, a waveform can represent a predetermined time-based portion of a haptic feedback to be output in response to displacement of the manipulandum. The predetermined time-based component of the haptic feedback can include one or more waveforms.

A predetermined time-based waveform can include a waveform configured to be output for a predetermined time period after a manipulandum crosses a threshold. When a manipulandum crosses a threshold, a sensor signal may be output by a sensor to a controller. The controller can include a processor-readable medium and can be configured to determine which predetermined time-based waveform is to be output if there are multiple waveforms stored in the processor-readable medium. In an embodiment having multiple thresholds, the controller can determine which predetermined time-based waveform to output depending on the particular threshold crossed. The application of the predetermined time-based waveform can include, for example, a reduction in the base-line waveform being output by an actuator. Alternatively, an actuator may apply a greater amount of force to the manipulandum to output the predetermined time-based waveform.

Furthermore, a predetermined time-based waveform can include a waveform having characteristics that are alterable based on detectable conditions. In one embodiment, the magnitude of the predetermined time-based waveform may be changed based on a detected instantaneous velocity of the manipulandum. In an alternative embodiment, the duration of the predetermined time-based waveform can be changed based on a detected instantaneous velocity of the manipulandum. In yet another embodiment, the duration and the magnitude of the predetermined time-based waveform can be changed based on a detected instantaneous velocity of the manipulandum. In this example, while the overall magnitude of the waveform can be changed using for example a multiplier or other electronics, the predetermined time-based waveforms acquired from memory can be the same for all velocity conditions. Alternatively, a velocity sensor could send a velocity signal to the controller. The controller can acquire a predetermined time-based waveform having different magnitudes depending on the detected velocity of the manipulandum.

The term "predetermined time-based component" is used herein to mean that at least a portion of the total haptic feedback output by an actuator is based on at least one predetermined time-based waveform. Thus, an actuator can output at least one predetermined time-based component based on the predetermined time-based waveform. The waveform or waveforms will have a net total duration and overall profile that can be predetermined by the user or alternatively, may be preprogrammed or hard-wired.

A functional block diagram of a control device according to an embodiment of the invention is illustrated in FIG. 1A. A device 100 includes a moveable manipulandum 110, a sensor 120, a controller 130, and an actuator 140. The moveable manipulandum 110 can be, for example, a button or a knob. An input force can be applied to the moveable manipulandum 110 by, for example, a user such that the moveable manipulandum 110 moves in the direction of the applied force.

As the moveable manipulandum 110 moves, sensor 120 outputs a position signal associated with the position of the moveable manipulandum 110. Controller 130 implements a closed-loop control and outputs a first force feedback signal to actuator 140. Actuator 140 outputs haptic feedback having a position-based component based on the position of the manipulandum. Additionally, when the moveable manipulandum 110 is moved to a predetermined position, the position signal output be sensor 120 indicates that the moveable manipulandum 110 has crossed a threshold position. The position signal output by the sensor 120 can be received at controller 130. Controller 130 outputs a second force feedback signal to an actuator 140, the force feedback signal being associated with a predetermined time-based component of haptic feedback. The actuator 140 can then apply haptic feedback having both a position-based component and a predetermined time-based component to the moveable manipulandum 110.

The controller 130 can be configured to a number of ways. For example, the controller 130 can be configured to output a force feedback signal having a single predetermined time-based waveform as the predetermined time-based waveform component (i.e., single-shot-output mode) or can be configured to output a continuous string or train of predetermined time-based waveforms as the predetermined time-based component (i.e., continuous output mode), when a threshold has been passed. These predetermined time-based waveforms can be associated with a variety of wave functions, as will be described in detail below. Controller 130 provides the force feedback signal to actuator 140, which outputs haptic feedback based on the force feedback signal.

FIG. 1B illustrates a position-based waveform and a predetermined time-based waveform that can be combined to produce haptic feedback having a predetermined time-based component and a position-based component. In this embodiment, the position-based component has a linear force profile that represents a spring force. The spring force can be generated by a real physical spring or can be generated by an actuator (i.e., a virtual spring force). A sensor can be configured to measure the displacement of the manipulandum to determine when the manipulandum crosses a threshold position, which is denoted in FIG. 1B as $X_T$. When the sensor determines that the threshold has been crossed by the manipulandum, the controller receives a position signal from the sensor and instructs the actuator to output the predetermined time-based component of the haptic feedback. An example of a predetermined time-based component is illustrated in FIG. 1B as a saw-tooth up waveform. Any type of waveform may be output by the actuator after the threshold position has been crossed, depending on the haptic feedback desired. The haptic feedback output to the manipulandum therefore includes a predetermined time-based component and a position-based component.

FIG. 2A illustrates an example of a train of predetermined time-based waveforms. A single given waveform has a maximum force with a magnitude of "A." In one embodiment, the predetermined time-based waveform is output as a reduction in the actuator-applied position-based component of the haptic feedback, for example, the base-line waveform. In an alternative embodiment, the predetermined time-based waveform can is output as an increase in the force output by an actuator. A predetermined time-based component is output beginning at time $t_1$ and will continue to be output until time $t_2$. The total duration of the predetermined time-based component of the haptic feedback is "te" for each waveform illustrated in FIG. 2A.

As illustrated in FIG. 2A, a predetermined time-based component of haptic feedback can be output having a negative magnitude that varies as a function of time. For example, when manipulandum 110 is positioned at a threshold position at time to, sensor 120 can output a position signal to a controller. Controller 130 can then provide a haptic feedback signal to the actuator 140, which may then output the predetermined time-based component of the haptic feedback. The predetermined time-based component of the haptic feedback may be output beginning at a time $t_1$. As discussed above, the duration of the predetermined time-based component of the haptic feedback may be "te." In the embodiment illustrated in FIG. 2A, "te" is equal to the difference between the time $t_2$ and time $t_1$.

As illustrated in FIG. 2A, at time $t_1$, the manipulandum 110 can be more easily manipulated by the user because of a decrease in the biasing force applied to the manipulandum 110. This is illustrated by a sharp decrease in the magnitude of the force being applied to the manipulandum 110 (i.e., from 0 to A as illustrated in FIG. 2A). From time $t_1$ to time $t_2$, the force applied to the manipulandum from actuator 140 increases back to zero. This type of predetermined time-based component can produce a substantial click sensation to a user.

In one embodiment, a single predetermined time-based component can be output when the manipulandum crosses a threshold for a duration "te."

In an alternative embodiment, a train of predetermined time-based waveforms can be output. FIG. 2A illustrates this continuous output having two additional predetermined time-based waveforms associated with different time periods. After the first predetermined time-based waveform component is output, a second predetermined time-based waveform can be output. FIG. 2A illustrates the predetermined time-based component as having, for example, a continuous-shot output, where the predetermined time-based waveform, which is output from time $t_1$ to time $t_2$, is repeated again after a time "to." While three predetermine time-based waveforms are illustrated, any number of predetermined time-based waveforms can be output based on the time that that manipulandum remains displaced more than a threshold amount.

While the predetermined time-based component of the haptic feedback illustrated in FIG. 2A has predetermined time-based waveforms that are symmetrical and produced at regular intervals, in alternative embodiments, the predetermined time-based waveforms of the predetermined time-based component of the haptic feedback can be asymmetrical or produced at irregular time intervals. Moreover, the thresholds triggering the output of the predetermined time-based component of the haptic feedback can be positioned at regular intervals within the range of motion of the manipulandum. Alternatively, the thresholds can be spaced unevenly throughout the range of motion of the manipulandum.

FIG. 2B illustrates three predetermined time-based waveforms according to another embodiment of the invention. In the embodiment depicted in FIG. 2B, the manipulandum 110 is disposed at a threshold position at time $t_1$. At this time, an actuator outputs the predetermined time-based component of the haptic feedback. A first predetermined waveform can have a duration $t_2$-$t_1$. As illustrated in FIG. 2B, the first predetermined waveform of the predetermined time-based component of the haptic feedback can be a pulse wave waveform. The pulse wave waveform has a substantially flat overall profile and has a magnitude "A," as depicted by the dashed line in FIG. 2B. Throughout the duration of the waveform being output for time $t_1$ to time $t_2$, the profile of the predetermined time-based component remains substantially constant. At time $t_2$, the controller 130 stops outputting the predetermined time-based waveform and the magnitude of the force applied to the manipulandum by the actuator returns to zero.

As illustrated in FIG. 2B, two additional predetermined time-based waveforms may be included in the predetermined time-based component of the haptic feedback. At time $t_3$, a full sine-wave is output as the predetermined time-based waveform. This time-based waveform is output from time $t_3$ to time $t_4$. At time $t_4$, the controller stops outputting the predetermined time-based waveform. The tactile feel given by the full sine wave waveform will be described in more detail below with respect to FIG. 3G.

At a time period ranging from $t_5$ to $t_6$, a third predetermined time-based waveform may be output. The third predetermined time-based waveform depicted is a double saw-tooth wave waveform, and is output from time $t_5$ to time $t_6$. At time $t_6$, the controller stops outputting the predetermined time-based waveform. The tactile feel given by the double saw-tooth wave waveform will be described in more detail with respect to FIG. 3C.

In the embodiment illustrated in FIG. 2B, the predetermined time-based component of the haptic feedback is based on all three of the predetermined time-based waveforms, each having a particular duration and a different haptic feel. The total duration of the predetermined time-based component of the haptic feedback can be, for example, $t_6$. Alternatively, each period may be the duration of a separate predetermined time-based component, each associated with a different manipulandum threshold.

Various predetermined time-based waveforms may be generated to create different haptic effects. Some examples of predetermined time-based waveforms are illustrated in FIGS. 3A-3I. Each haptic effect (i.e., how the predetermine time-based waveform "feels") shown in FIGS. 3A-3I is described with respect to an embodiment in which the position-based component is a virtual or a real spring.

FIG. 3A is a graph illustrating an example of a saw-tooth down waveform according to an embodiment of the invention. This waveform will generate the sensation of a soft click. Haptic feedback based on this waveform feels active as the force profile goes from a low force value to a high force value at the discontinuity "D."

FIG. 3B is a graph illustrating an example, of a saw-tooth up waveform according to an embodiment of the invention. This waveform can produce a relatively strong click-sensation in comparison to the saw-tooth down waveform depicted in FIG. 3A. Alternatively, this predetermined time-based waveform can match the strength of the saw-tooth down waveform using a lower amplitude than that required to produce a comparable click using the predetermined time-based waveform illustrated in FIG. 3A. The force profile illustrated in FIG. 3B has a more passive feel as the force profile proceeds from a high force value to a low force value.

FIG. 3C is a graph illustrating an example of a saw-tooth double waveform according to an embodiment of the invention. The saw-tooth double waveform produces the sensation of two clicks. The ability of the user to distinguish these two predetermined time-based waveforms will vary, but typically, the two predetermined time-based waveforms can be difficult to distinguish from each other if they are within 25 milliseconds (ms) of each other. Additionally, these clicks can feel like unrelated events if the predetermined time-based waveforms are temporally spaced more than 250 ms from one another. Thus, temporal spacing between the predetermined time-based waveforms can be, for example, between about 25 ms and about 250 ms.

FIG. 3D is a graph illustrating an example of a saw-tooth down wave waveform according to another embodiment of the invention. While a saw-tooth down wave waveform is illustrated, a saw-tooth up wave waveform may also be produced. A saw-tooth wave waveform having half of the amplitude of a saw-tooth up waveform or the saw-tooth down waveform will feel substantially the same as either the saw-tooth up waveform or the saw-tooth down waveform, depending on the signal of the saw-tooth wave. One benefit of using a predetermined time-based waveform having this profile is that the peak magnitude of the actuator can be reduced to cause the same magnitude sensation. For example, an actuator may be able to output a force having +/−200 grams of force, as opposed to 400 grams of force, such that the magnitude can feel the same.

FIG. 3E is a graph illustrating an example of a pulse waveform according to another embodiment of the invention. The pulse waveform may produce a substantially identical feel as the saw-tooth down waveform for durations of less than about 50 ms. When the pulse has a duration of greater than 75 ms, the haptic feedback provided to the user can seem like two clicks. This is based on the two force discontinuities produced at the leading and trailing edges of the pulse waveform as illustrated in FIG. 3E. When the pulse has a duration greater than 250 ms, the two clicks may feel like unrelated events. Thus, the temporal spacing between the slope changes can, for example, be between 25 ms and 250 ms.

FIG. 3F is a graph illustrating an example of a square wave waveform according to another embodiment of the invention. The square wave waveform has a similar feel to that of the saw-tooth wave waveform depicted in FIG. 3D for durations of less than about 75 ms. The click force output using this waveform, however, will be larger than the saw-tooth wave waveform illustrated in FIG. 3D. As illustrated in FIG. 3F, the square wave waveform can produce three different force discontinuities "D." These three different force discontinuities can be distinguished from one another for durations of, for example, greater than about 150 ms.

FIG. 3G is a graph illustrating an example of a full sine wave waveform according to another embodiment of the invention. When the full sine wave waveform is used as a predetermined time-based waveform, substantially smooth detents can be produced. These detents may be smooth even for durations of less than 100 ms. This waveform may be difficult for a user to sense if it is longer than 200 ms due to the slow and continuous nature of the force profile. It is to be understood that a full sine wave waveform may have either a positive or a negative sign, and can have any period, so long as the temporal duration of the effect provides the appropriate haptic feedback.

FIG. 3H is a graph illustrating an example of a half sine waveform according to another embodiment of the invention. A half sine-waveform can produce a soft detent or click sensation, and typically has a duration of less than 100 ms. The duration of the half sine waveform can alternatively be between 10 ms and 20 ms. The half sine waveform can have a less lively feeling than the full sine waveform depicted in FIG. 3G because of the relative differences in the overall waveform.

FIG. 3I is a graph illustrating an example of a triangular wave waveform according to another embodiment of the invention. The triangle wave waveform feels substantially the same as the full sine waveform for periods of about 30 ms or greater. The feedback produced by the triangular wave waveform will, however, feel slightly less lively than the feedback produced by the full sine waveform when the waveforms have an equal amplitude.

While particular waveforms have been described with reference to FIGS. 3A-3I, these waveforms are not intended to be limiting and it is to be understood that any type of predetermined time-based waveform can be output from a haptic feedback controller or processor. For example, hybrid waveforms can be created using a half sine waveform and a pulse waveform that would produce a slight detent force and then terminate with a substantial click force. When designing customized waveforms or programming any of the waveforms described with reference to FIGS. 3A-3I, one should note that the relative magnitude of the predetermined time-based waveform rather than the overall magnitude of the predetermined time-based waveform control certain aspects of the haptic feedback. While particular predetermined time-based waveforms were described with reference to FIGS. 3A-3I, in alternative embodiments, predetermined time-based waveforms can include, for example, waveforms having durations of 500 ms or more.

Haptic feedback produced in a haptic button can have a position-based component and a predetermined time-based component, where the position-based component of the haptic feedback and the predetermined time-based component of the haptic feedback collectively constitute the overall haptic effect in a manipulandum.

Figure 4:
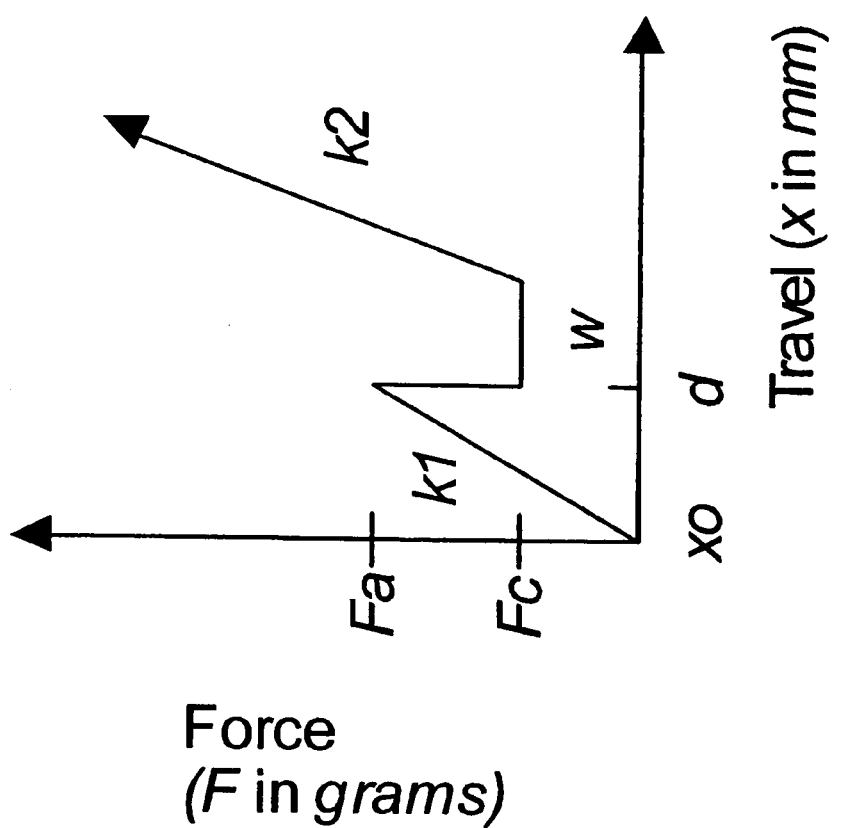
FIG. 4 is a graphical representation of a position-based component of haptic feedback according to an embodiment of the invention.

One example of a position-based component of haptic feedback is illustrated in FIG. 4. FIG. 4 illustrates a position-based force profile that is configured to be output by a controller in a haptic device. As illustrated, the force profile is linear from position "xo" to position "d." This is a simulated spring force having a spring constant "k1." When the manipulandum is disposed in position "d," the force output by an actuator decreases from "Fa" to "Fc." This sudden decrease in the force output by the actuator can cause a click sensation to be output at the manipulandum. If the manipulandum is further depressed, the force output by the actuator for a distance "w" remains constant. After being displaced an additional distance "w," the actuator can then output a spring force having a spring constant "k2," which opposes the movement of the manipulandum.

The position-based component illustrated in FIG. 4 can then be combined with one of the predetermined time-based components, for example, a predetermined time-based component illustrated in FIGS. 3A-I, to achieve a robust set of haptic force profiles, as will be described below. By outputting haptic feedback having both a position-based component and a predetermined time-based component, a manipulandum can use a lower-resolution sensor and can have a lower sampling rate, while producing a high-quality haptic effect.

In some embodiments a multi-level button may be implemented. A multi-level button can allow a user to select among a number of different features using a single button. A multi-level button can allow a user to apply an appropriate degree of force to remain at the desired level. The predetermined time-based component of the haptic feedback can convey to a user that a particular level has been reached. In one embodiment, the user can feel a click for each level. Users can learn relatively quickly how much force is needed to reach a desired level, and therefore the button can allow a user to select directly a desired feature from a number of different features using a single press of a button.

The spring force can be output by an actuator, or in the alternative, the spring force may be output by a physical spring having a predetermined spring constant. For example, a spring force profile is illustrated in FIG. 5.

Figure 5:
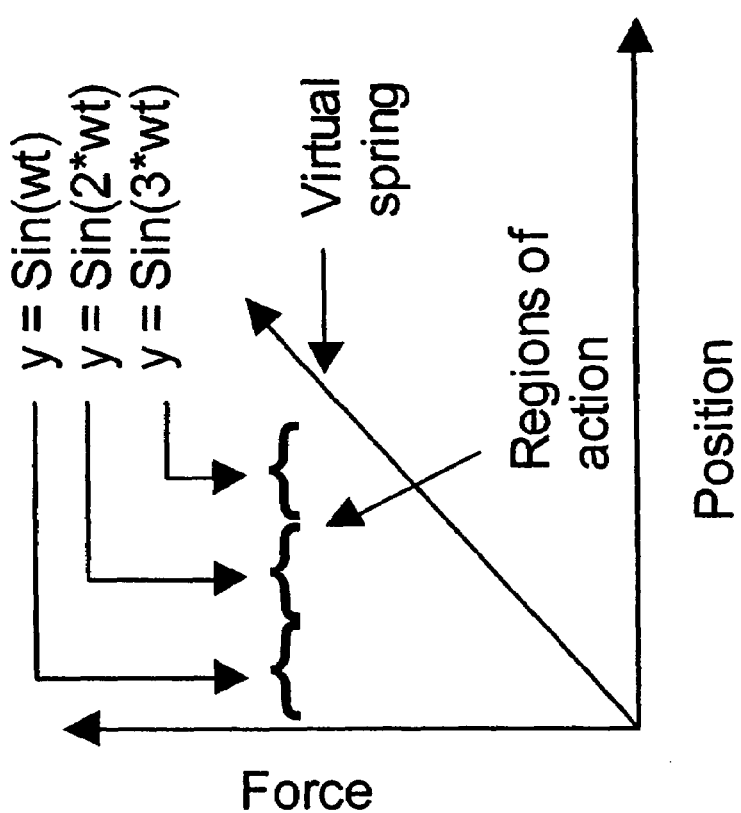
FIG. 5 is a graphical representation of haptic feedback having a position-based component and three predetermined time-based components.

FIG. 5 shows haptic feedback output by an actuator according to another embodiment of the invention. The haptic feedback is based on a position-based component and a predetermined time-based component. The position based component can be output by an actuator and may be a virtual spring force. Additionally, a manipulandum having haptic feedback according FIG. 5 has three predetermined regions, each associated with a predetermined time-based component of the haptic feedback, and has a single position-based component of the haptic feedback. In one embodiment, the manipulandum can have three regions of action each of which are uniquely associated with one of three threshold positions. For each of these three regions, a predetermined time-based component of the haptic feedback is output by the actuator. For example, the actuator can output a first predetermined time-based component associated with the first region of action having a waveform represented mathematically as $y=\sin(\omega t)$. In other words, the first predetermined time-based component can include a single predetermined time-based waveform (i.e., single-shot output) or may include a continuous train of predetermined time-based components represented by $y=\sin(\omega t)$. Additionally, a manipulandum exhibiting the force profile illustrated in FIG. 5 can output two additional predetermined time-based components of the haptic feedback at two different active regions. As illustrated in FIG. 5, the predetermined time-based component of the haptic feedback associated with the second region of action has force profile mathematically represented as, for example, $y=\sin(2\omega t)$, and a predetermined time-based component of the third active region has a force profile mathematically represented as, for example, $y=\sin(3\omega t)$. These additional regions of action can include, for example, vibrational regions of action, each vibrational region of action having a vibration of a different frequency.

Alternatively, the embodiment illustrated in FIG. 5 can having only one threshold and the first, second and third region of action may be output as time-based components in temporal sequence.

Figure 6:
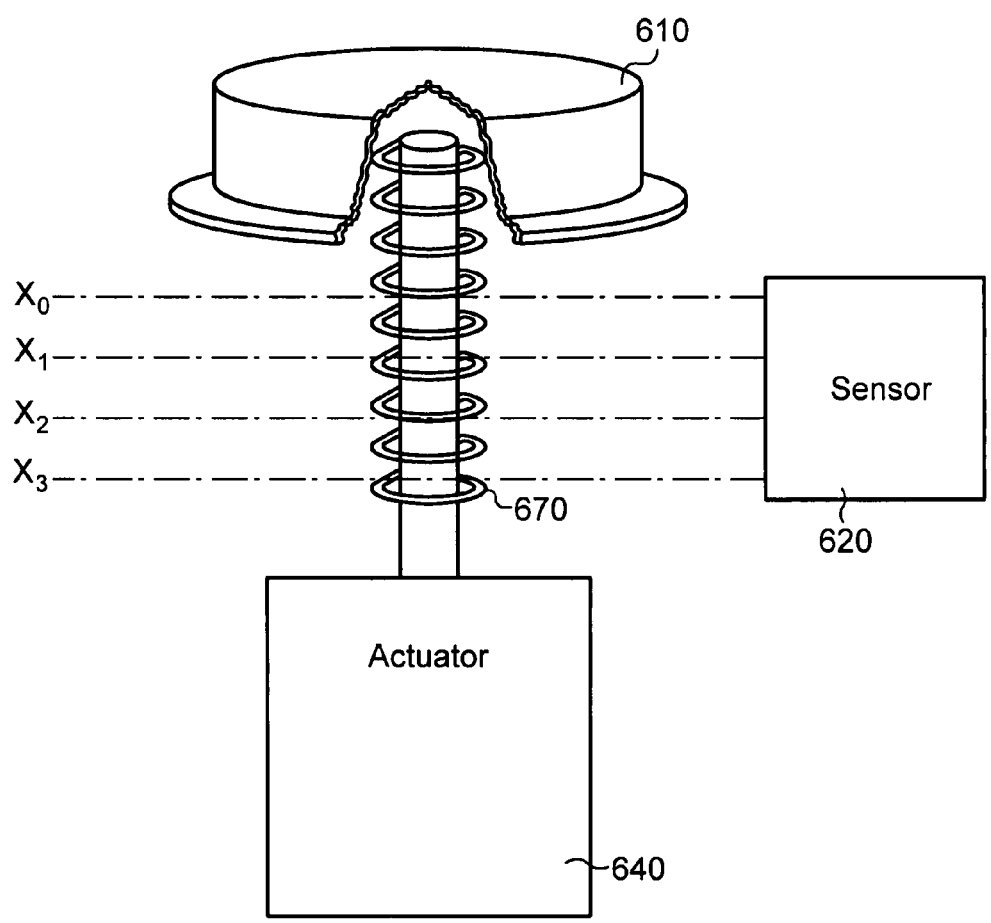
FIG. 6 is a partial cross-sectional view of a three-level button according to an embodiment of the invention.

FIG. 6 is a partial cross-sectional view of a three-level button according to an embodiment of the invention. For example, the three-level button illustrated in FIG. 6 can be configured to output the force profile illustrated in FIG. 5. The button includes a moveable manipulandum 610. In the illustrated embodiment, the manipulandum 610 is moveable between three different levels, $x_0$ being the resting point, $x_1$ being the first threshold, $x_2$ being the second threshold, and $x_3$ being the third threshold. The actuator 640 also includes a biasing element 670, which is illustrated in FIG. 6 as a physical spring. The physical spring can be configured to bias the moveable manipulandum 610 back to the resting point $x_0$. While a physical helical spring is illustrated in FIG. 6, the biasing element can be any type of physical or virtual spring that applies a force by either a physical object or an actuator, respectively. For an actuator implementing a virtual spring, the actuator receives signals indicating an amount of force to apply to the moveable manipulandum based on the position of the movable manipulandum (i.e., the position-based component of the haptic feedback).

More Specifically, the actuator 640 can be configured to apply haptic feedback having a predetermined time-based component and a position based component based on a haptic feedback signal received from a controller or other electrical device (not illustrated). The controller or other electrical device can receive a position signal from a sensor 620, that indicates when a particular threshold has been crossed the controller or other electrical device can then send actuator 640 the haptic feedback signal.

The sensor can be, for example, an optical sensor, an electrical sensor, or an electro-mechanical sensor. While a single sensor 620 is illustrated in FIG. 6, multiple sensors can be used to determine when a particular threshold from a number of thresholds has been crossed by the moveable manipulandum. In one embodiment, a single sensor can be used, having a resolution commensurate with the number of thresholds to be crossed by the moveable manipulandum. For example, in the embodiment illustrated in FIG. 6, a sensor having at least a three-bit resolution may be used to detect when to output the predetermined time-based component of the haptic feedback. In another embodiment, the sensor can have a sensor resolution, for example, between 1 and 8 bits. In yet another embodiment, the sensor can have a sensor resolution, for example, between 1 and 16 bits.

Figure 7:
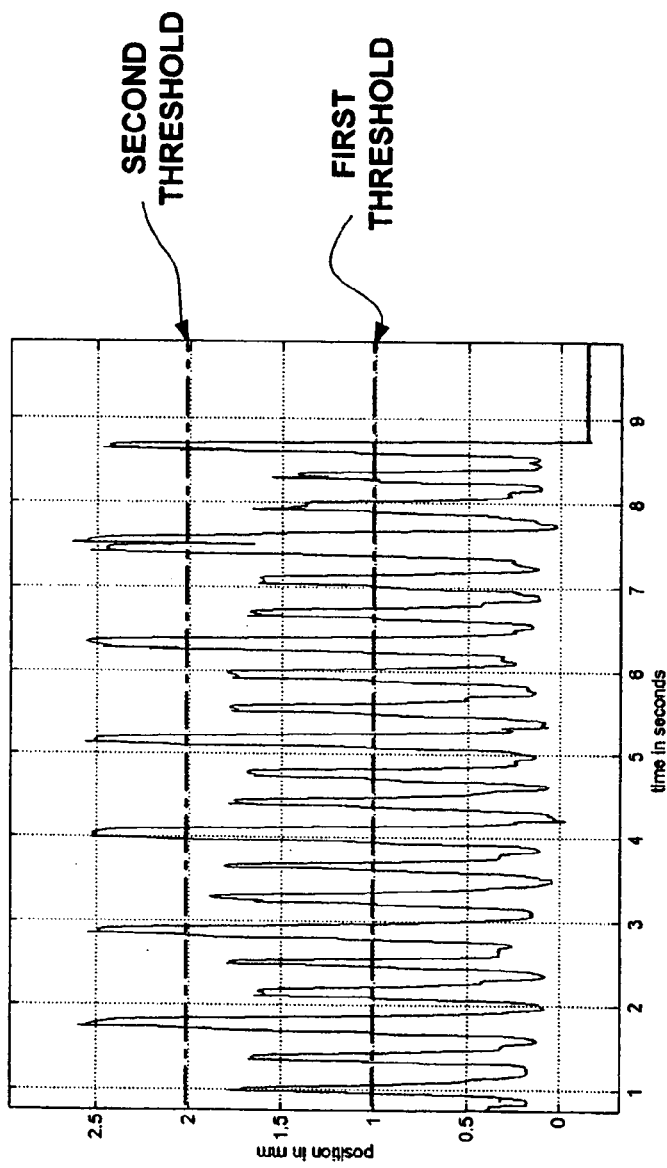
FIG. 7 is a graphical representation of button position as a function of time produced using a two-level button.

An example of a plot of manipulandum position versus time for a two-stage haptic button is illustrated in FIG. 7. In this embodiment, the biasing force is applied to the manipulandum by a virtual spring force, where the biasing force is applied by, for example, an actuator controlled by a processor. The manipulandum being manipulated by a user in FIG. 7 is a button that has a first threshold at 1 mm and a second threshold at 2 mm. The plot in FIG. 7 depicts the spatial displacement of the button initiated by a user. As illustrated in FIG. 7, the button is depressed to the first threshold two times and to the second threshold once. This pattern was repeated a number of times. In such an embodiment, the user can depress the button three times (twice to the second level, and once to the first level) within one second.

As shown in FIG. 7, the user can over-shot the threshold level as the force is removed from the spring. The degree of overshoot can be almost constant and effectively approximates the same as that of a purely position-based haptic button.

Figure 8:
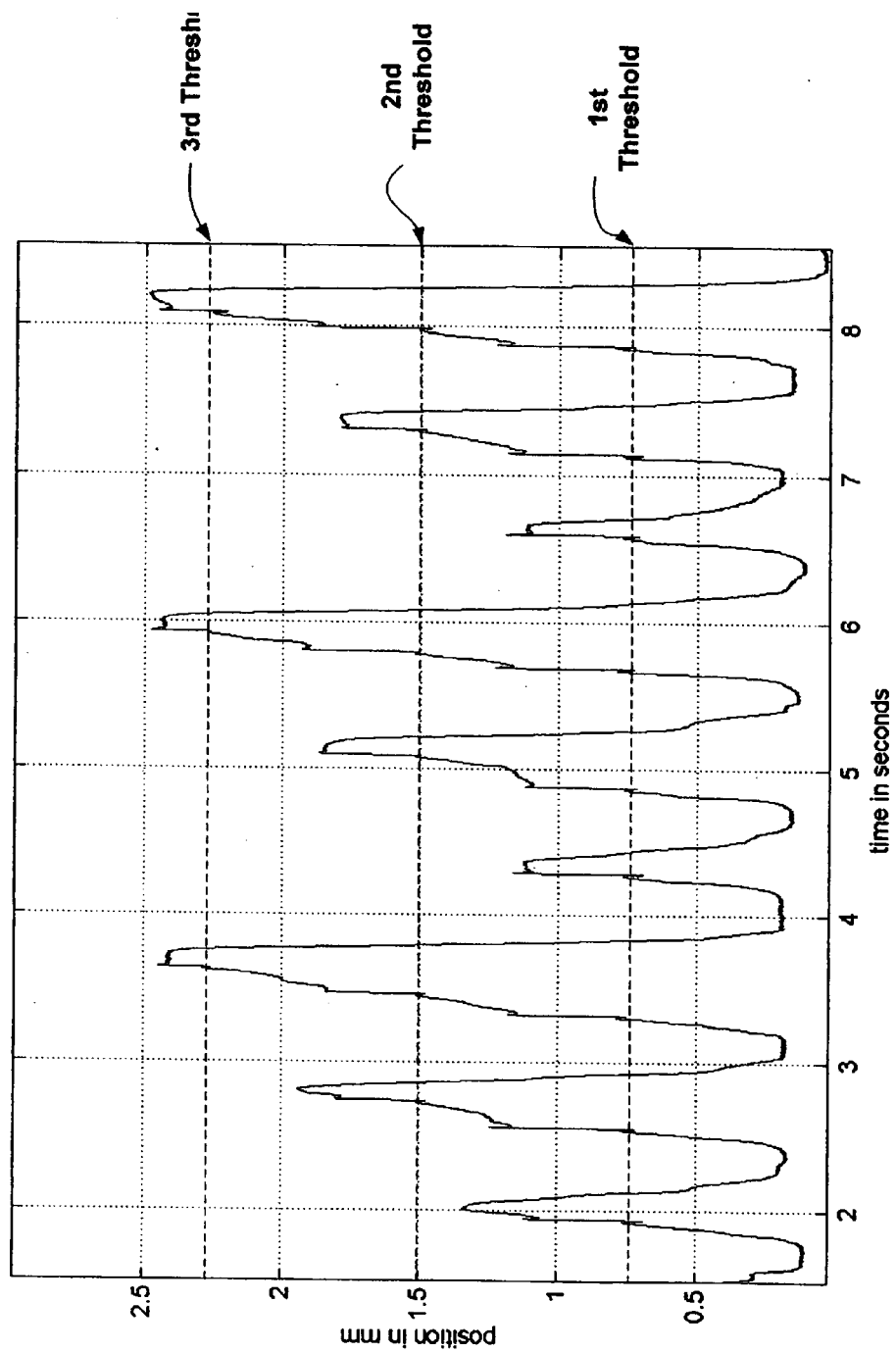
FIG. 8 is a graphical representation of button position as a function of time produced using a three-level button.

FIG. 8 illustrates an example of a plot of button displacement versus time for a three-level button. As shown in FIG. 8, the three-level button has a first threshold at 0.75 mm, a second threshold at 1.5, and a third threshold at 2.25 mm. As shown in FIG. 8, a button can be depressed to a first level. Typically, when the button is depressed to the first level, some overshoot of the threshold can occur due to the applied force. This overshoot is illustrated by difference in displacement from the threshold at 0.75 mm to about 1.25 mm. Upon the button being released, the total button displacement decreases. As shown in FIG. 8, the button can then be pressed to a second level. The second level surpasses the second threshold level at a displacement of 1.5 mm. In one embodiment, after the manipulandum has been depressed to the second level, a user can feel two click sensations (i.e., one click sensation for each threshold). After reaching the second threshold, the button can be released and the button can return to approximately its resting position. The button can be depressed a third time. The third time the button is depressed its displacement surpasses the third threshold position. In one embodiment, after the manipulandum has been depressed to the third threshold, the user can feel three click sensations (i.e., one click for each threshold). When the button is released, it returns to its resting position. This pattern is shown as being repeated two more times, each repetition taking less than two seconds.

Thus, as the graph of FIG. 8 illustrates, the button can be used to rapidly cross a particular threshold level, and can readily reach that threshold to select a particular function associated with that particular threshold. By outputting haptic feedback as the button is displaced across each threshold, a user can sense an indication that a particular threshold has been crossed, and can quickly and accurately select a desired function.

Furthermore, these results are similar whether a virtual spring and a virtual click force are output, or whether a physical spring and a virtual click sensation are output. Both the virtual spring with a virtual click force on one hand, and a physical spring and a virtual click force on the other hand approximate the feel of a physical spring with a physical click or detent.

Figure 9:
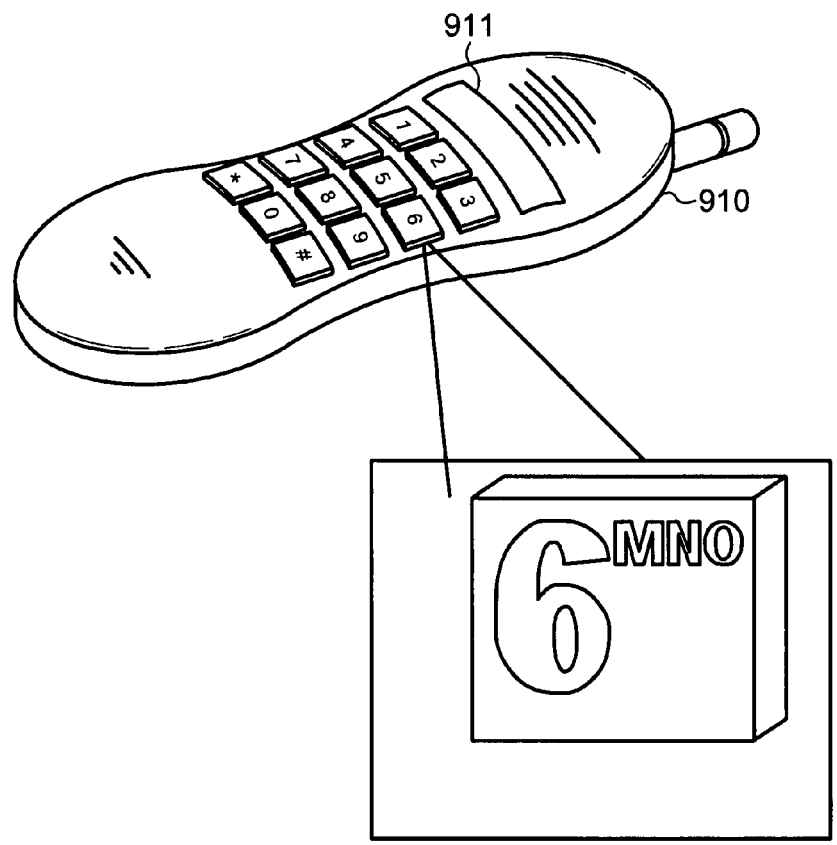
FIG. 9 depicts a mobile device having haptic buttons according to another embodiment of the invention.

An example of an electronic communications device using a haptic button will now be described with reference to FIG. 9. FIG. 9 illustrates a cellular phone according to an embodiment of the invention. For example, the cellular phone can include multi-level buttons each having three threshold levels, each of the threshold levels corresponding to a particular letter of the alphabet associated with the numerical key on the telephone.

The operation of a communication device will now be described with reference to FIGS. 7 and 9. The communication device 910 can have, for example, a number of buttons, 0-9, *, and # for a cellular phone. The numbers 2-9 may bear individual letters of the alphabet. For example, the "6" button is illustrated in FIG. 9. The "6" button can bear the letters M, N, and 0, as illustrated in FIG. 9. In this embodiment, each level of the three level button is associated with a particular function associated with the button. For example, as illustrated in FIG. 7, a three level button may have a threshold at displacements of 0.75 mm, 1.5 mm, and 2.25 mm, each of the thresholds being associated with a particular letter of the alphabet.

When the button is depressed to the first threshold, an actuator can output a first predetermined time-based component of the haptic feedback. The first predetermined time-based component of the haptic feedback can include a predetermined time-based waveform. For example, the predetermined time-based component of the haptic feedback can include any of the force waveforms illustrated in FIGS. 3A-3I. The user is notified by the output of the predetermined time-based component of the haptic feedback, when the first threshold is reached. When the button is released, an "M" may appear on the screen of the communication device.

If a greater force is applied in a direction opposite to the direction of the biasing force, a second predetermined time-based component of the haptic feedback can be output by the actuator when the button surpasses the second threshold. Once again, the second predetermined time-based waveform component of the haptic feedback can include any of the predetermined time-based waveforms illustrated in FIGS. 3A-3I, and can include variants thereon. The second predetermined time-based component of the haptic feedback need not be the same as the first predetermined time-based component of the haptic feedback, but can be substantially identical if desired. If the button is released after the second threshold has been exceeded, then an "N" may appear on the display 911 of the communication device 910.

If a greater force is applied to the moveable manipulandum (i.e., the "6" button of FIG. 9), the manipulandum can exceed the third threshold. When the moveable manipulandum surpasses the third threshold, a third predetermined time-based component of the haptic feedback can be output by the actuator. The third predetermined time-based component of the haptic feedback can include any of the predetermined time-based waveforms illustrated in FIGS. 3A-3I, and can include any variations or combinations of the predetermined time-based waveforms depicted therein, depending on the desired tactile "feel" of the button. After manipulandum is released, the bias force (which may be either physical or virtual) can cause the manipulandum to return to its resting position, and an "O" will be output on the display 911 of the communication device, 910.

In another embodiment, the moveable manipulandum is a knob, such as, for example, a knob on a stereo. A knob according to an embodiment of the invention includes a manipulandum which is moveable between a first position and a second position, the second position being associated with a threshold position. The knob can also include, for example, a sensor configured to output a position signal based on a detected position of the manipulandum. Furthermore, the knob can also include an actuator configured to output haptic feedback having a position-based component and a predetermined time-based component to the manipulandum based on the position signal. The predetermined time-based component of the haptic feedback can be based on a predetermined time-based waveform. In one embodiment, the predetermined time-based component is part of a simulated detent. In alternative embodiments, the predetermined time-based component can be combined with a simulated spring force, a simulated damper force, a simulated barrier force, a hill, or a periodic force.

Figure 10:
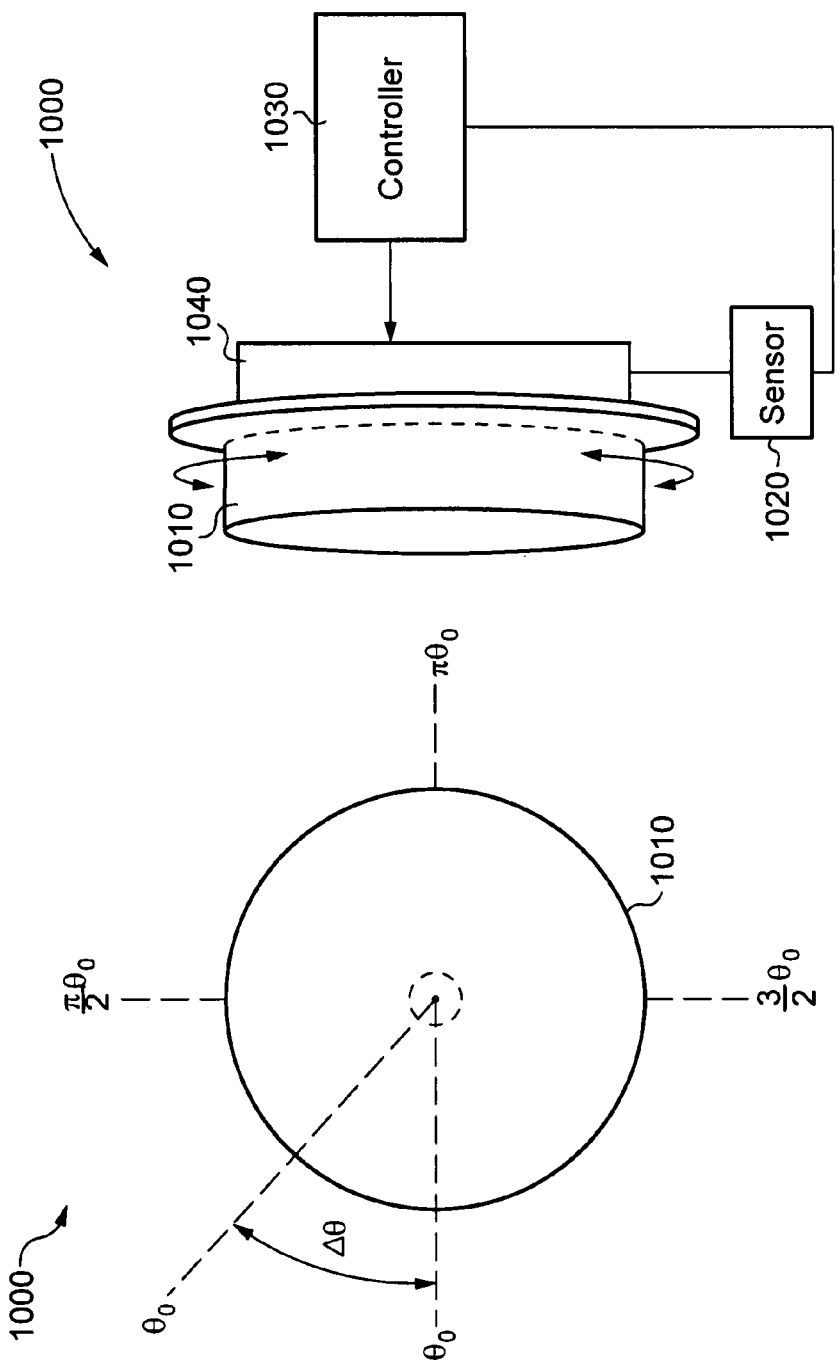
FIG. 10A depicts a front view of a knob according to an embodiment of the invention.
FIG. 10B depicts an elevation view of a knob according to an embodiment of the invention.

An embodiment of a knob according to an embodiment of the invention will be described with reference to FIGS. 10A and 10B. FIG. 10A illustrates a front view of an example of a knob according to one embodiment of the invention. FIG. 10A depicts a knob 1000 including a manipulandum 1010. The manipulandum 1010 maybe rotated about a central axis. For example, manipulandum 1010 can be turned from a first position, $\theta_0$ to a second position $\theta_D$, which is rotationally displaced from $\theta_0$ by distance/arc $\Delta\theta$. In one embodiment of the invention, manipulandum 1010 can be configured to rotate between $\theta_0$ and $2\pi\theta$. In an alternative embodiment, manipulandum 1010 can be configured to rotate only some fraction of the rotational distance between $\theta_0$ and $2\pi\theta$. Manipulandum 1010 can be configured to rotate any number of times depending on the desired application of the knob.

As illustrated in FIG. 10B, knob 1000 can include actuator 1040, which is coupled to sensor 1020. Sensor 1020 can be coupled to controller 1030. Controller 1030 can be coupled to actuator 1040. While the actuator 1040 depicted in FIG. 10B is located adjacent to the back of manipulandum 1010, the particular placement of actuator 1040 can depend on the type of actuator being used. For example, an actuator can include a magnetorheological braking system applies a resistive force to manipulandum 1010. In this case, the actuator 1040 can be placed at the outer edge of knob 1010. Alternatively, manipulandum 1010 can be at least partially hollow and can include an actuator disposed proximate to and within a hollow portion of the moveable manipulandum. Actuator 1040 may be any type of actuator, including, for example, a DC motor, voice coil actuator, pneumatic or hydraulic actuator, magnetic particle brake, and electromagnetic brake.

Sensor 1020 can include any number of known sensors. The resolution of the sensor 1020 can be related to the quality of the haptic feedback. For example, a high resolution sensor (e.g., 10,000 counts per revolution), may be used to determine the particular displacement (in this instance "displacement" refers to rotational displacement) of the manipulandum from a first position. Sensor 1020 can be an optical encoder or an electrical encoder and may be positioned proximate to the axis of rotation of the moveable manipulandum 1010. Alternatively, sensor can be located proximate to the outer edge of the manipulandum to measure the rotational position of the manipulandum based on, for example, a code located on the outer surface of the manipulandum 1010. Sensor 1020 can be any type of sensor configured to detect rotational motion.

Controller 1030 can include a microprocessor. In accordance with one embodiment of the invention, controller 1030 can include a processor-readable medium such as a memory device that stores a number of predetermined time-based waveforms that are to be output via actuator 1040 when the manipulandum reaches a particular position.

Figure 11:
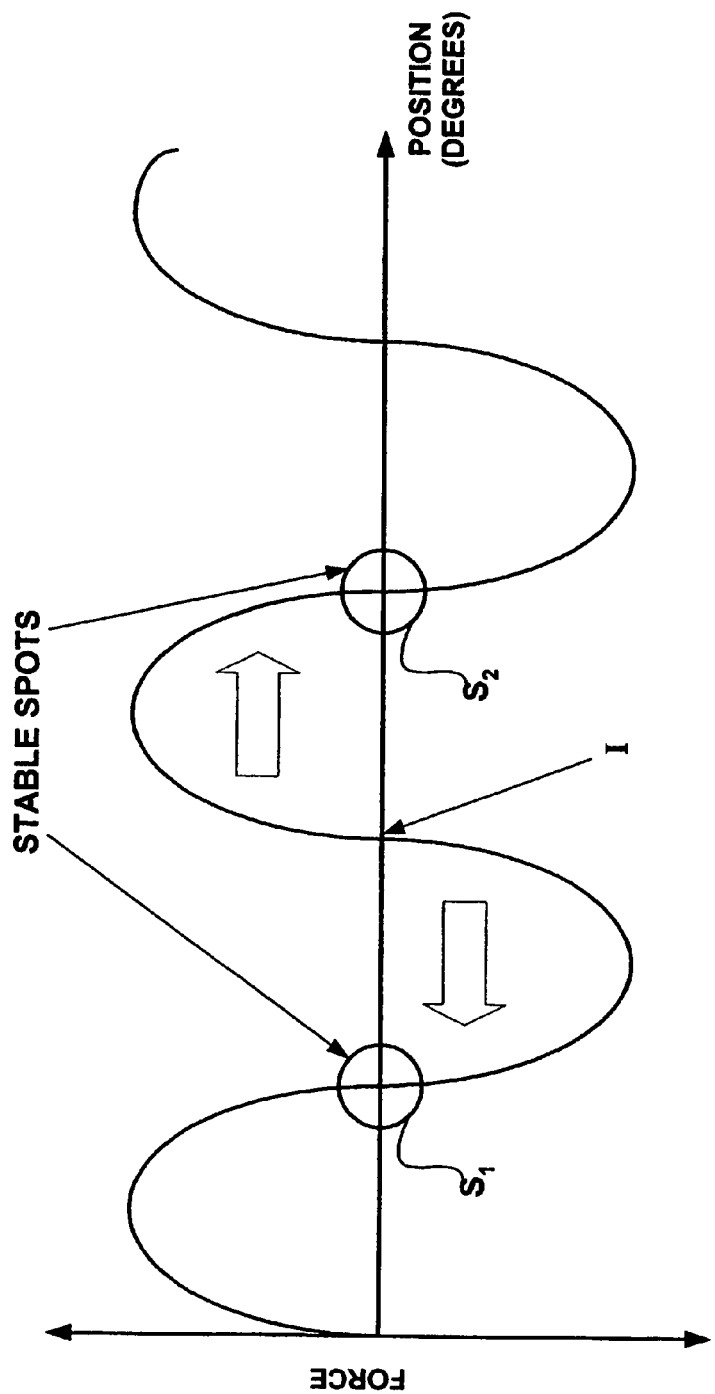
FIG. 11 is a graphical representation of a sinusoidal position-based detent profile according to an embodiment of the invention.

In one embodiment, the position-based component is a sinusoidal detent profile. FIG. 11 illustrates a sinusoidal detent profile that can be the position-based component of the haptic feedback. Predetermined time-based components of the haptic feedback may be output when the manipulandum is at a threshold position to give the haptic feedback a more desirable feel.

Figure 12:
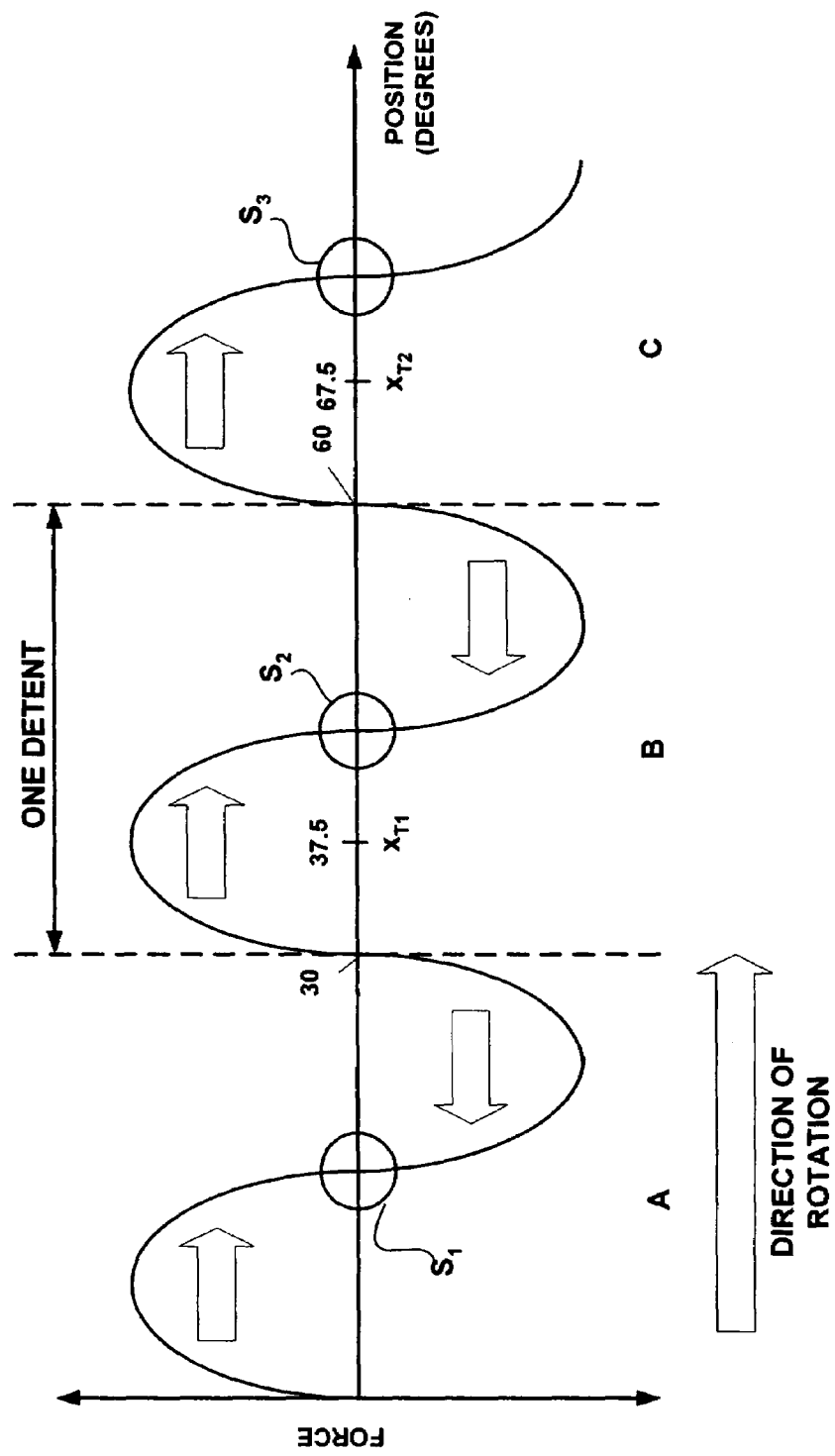
FIG. 12 is a graphical representation of an example of a position-based component of haptic feedback to be output when the manipulandum is being rotated in a clock-wise direction.

FIG. 11 illustrates an example of a position-based component of haptic feedback, which is, for example, a sinusoidal position-based detent profile. The detent profile illustrated in FIG. 11 has two stable spots within the profile. This position-based component can be used in connection with a manipulandum that can be, for example, a knob. As the manipulandum is rotated, the position-based force profile is output by the actuator. Thus, as the manipulandum is rotated, the manipulandum will seem to want to remain at the stable spots $S_1$ and $S_2$. The position-based component feels as if the stable spots $S_1$, $S_2$ have a simulated gravitational pull, which influences the manipulandum. Before inflection point "I", the manipulandum will be drawn towards the first stable spot $S_1$. After reaching the inflection point, "I" on the plot, the manipulandum will begin to be drawn towards the second stable spot $S_2$. This position-based profile simulates a physical detent profile. FIG. 12 illustrates an example of a position-based component of haptic feedback and two threshold positions as a knob is rotated clockwise. As in FIG. 11, FIG. 12 shows stable spots $S_1$, $S_2$, and $S_3$. In this embodiment, one detent will be represented by one period of the sine wave, as illustrated in FIG. 12. As the manipulandum is rotated clockwise, a position-based sinusoidal detent profile is output. In addition to outputting the position-based component, a predetermined time-based component can also be output when the manipulandum passes a threshold position. In the embodiment illustrated in FIG. 12, the first threshold position is illustrated at $X_{T1}$, and a second threshold position is illustrated as $X_{T2}$. While these thresholds appear at the point of maximum force output for each detent, the thresholds may be positioned anywhere within the range of motion of the manipulandum.

The threshold positions are determined, for example, by a controller and a state machine. A sensor can determine the direction of rotation of the manipulandum and convey this information via a signal to the controller. The controller can include a state machine and may determine the angular position to position the thresholds. In one embodiment, when the manipulandum is rotating in a counter clockwise direction (i.e., the position is moving from left to right, as illustrated in FIG. 12), the state machine will place the detent at, for example, a quarter period within the single detent profile. By way of example, the second detent in FIG. 12 can be output when the manipulandum is rotated from 30 degrees to 60 degrees. In this embodiment, the controller may be configured such that the threshold coincides with the maximum force output from the actuator. Therefore, the first threshold $X_{T1}$ can be located, for example, 37.5 degrees. Likewise, the second threshold can be located, for example, at 67.5 degrees. When the manipulandum is rotated past these threshold positions, the controller can instruct the actuator to output a predetermined time-based waveform. Any type of predetermined time-based waveforms can be output, such as, for example, the predetermined time-based waveforms illustrated in FIGS. 3A-3I.

Figure 13:
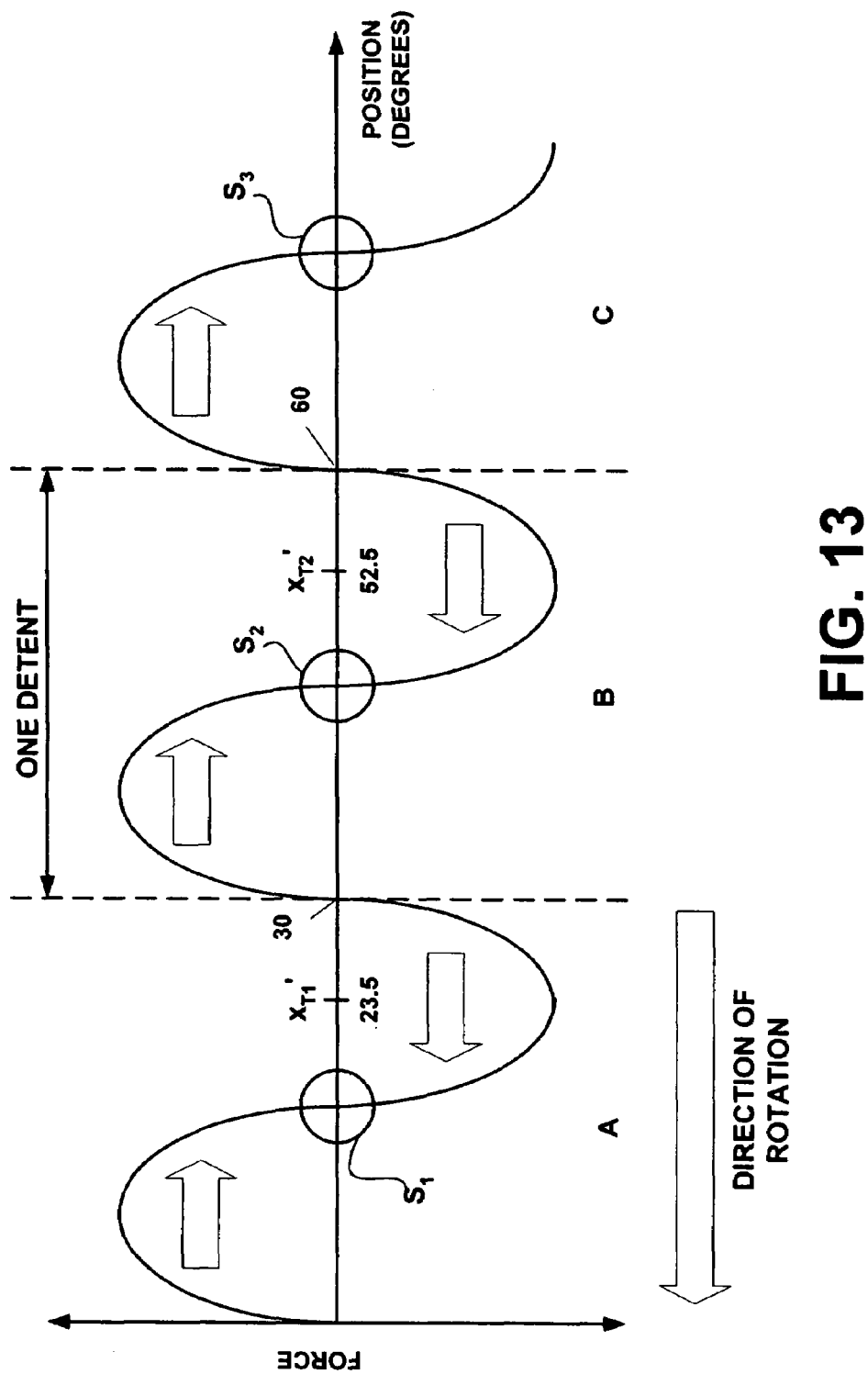
FIG. 13 is a graphical representation of an example of a position-based component of a haptic feedback to be output when the manipulandum is being rotated in a counter clock-wise direction.

FIG. 13 illustrates the position-based component of the haptic feedback for the embodiment illustrated in FIG. 12. In FIG. 13, the manipulandum is being rotated in a counter-clockwise direction (i.e., from right to left in FIG. 13). When the manipulandum is being rotated in a counter-clockwise direction, the threshold positions can be in a position different from that shown in FIG. 12 for rotation in the clockwise direction. For example, the threshold positions $X_{T1}'$, $X_{T2}'$ associated with counter-clockwise movement may be located at the position within the periods where the force output by the actuator is at a minimum. Therefore, for the detent extending from, for example, 30 degrees to 60 degrees, the threshold position $X_{T2}'$ can be located at 52.5 degrees. The threshold $X_{T1}'$ located in the first detent profile can be located, for example at 23.5 degrees. It is to be understood that these threshold positions are by way of example only, and that these threshold positions may be placed anywhere in the range of motion of the manipulandum.

In an alternative embodiment, the predetermined time-based component can be output only once per detent. When a manipulandum is moved, for example, from $S_3$ towards $S_2$, and passes from detent "C" to detent "B," a single predetermined time-based waveform will be output when the manipulandum is moved past $X_{T2}'$, which can be, for example, 52.5 degrees (FIG. 13). After the predetermined time-based component has been output, the manipulandum may be moved between 30 degrees and 60 degrees without a second predetermined time-based component being output. If the manipulandum is moved from detent "B" to detent "A" and then back into detent "B," a predetermined time-based waveform can be output at $X_{T1}$, which can be, for example, at 37.5 degrees (FIG. 12).

Figure 14:
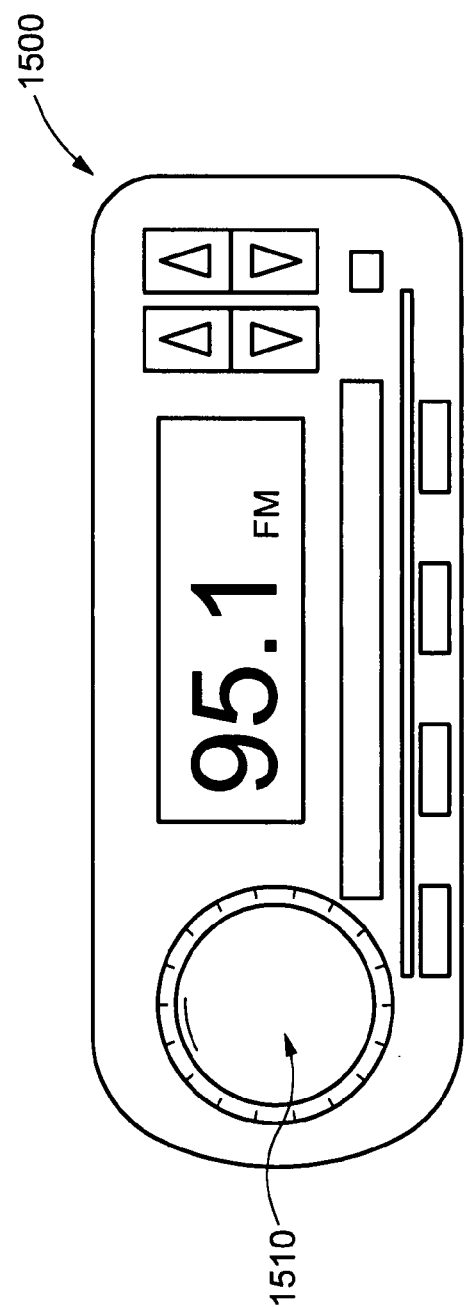
FIG. 14 is a plan view of a car stereo employing a knob according to another embodiment of the invention.

FIG. 14 illustrates a car stereo 1500 incorporating a knob according to the invention. The knob includes a manipulandum 1510 for controlling functions of the stereo, such as power, volume, tuning etc. Alternative stereos are possible having separate volume and tuning knobs.

Although a haptic button having haptic feedback including both a predetermined time-based component and a position-based component has been disclosed above with reference to a button on a telephone, for example, a haptic button can be used in any device having single or multi-function buttons. Additionally, while a knob according to one embodiment has been described above as being used in a car stereo system, a knob can be used in any system using a knob or a dial.

Although specific embodiments of the invention were described as a knob and a button, the knob can also operate as a button. For example, a knob can be depressed to a particular level to allow a user to select a particular function associated with the knob. In one embodiment, a knob can be a knob on a car stereo and can include a first level, a second level, and a third level. The first level can be associated with a power function. The second level can be associated with a volume control function. The third level can be associated with a tuning function.

In yet another embodiment of a knob/button combination, as described above, when one function of the knob is selected (e.g., volume), the controller for the knob can play one type of predetermined time-based component of the haptic feedback, or more generally, the knob can have one "feel." When the knob/button is depressed to change the functionality of the knob, the controller for the knob can play a second predetermined time-based component of the haptic feedback, giving the second function of the button a different feel than the first function. Therefore, a user can distinguish the different functions based on the feel of the knob rather than by the resultant effect of manipulating the knob.

Although a specific embodiment was described above with respect to a phone employing a multi-level button for actuating various alpha-numeric symbols on the phone, a multi-level button can also be employed for other buttons that have multiple functions. For example, a button that has both an "on/off" function and an "end call" function can employ the principles of the invention.

Although the invention is described with reference to a button embodiment and a knob embodiment, the invention is applicable to any type of manipulandum, and can be employed in a trigger. A manipulandum including a trigger of a simulated weapon or gun according to an embodiment of the invention can include either a continuous mode output or a single-shot output depending on the particular simulated weapon being used. Additionally, a multi-level trigger according to the invention can include a trigger that is moveable between a number of different levels, each of the different levels being associated with a particular weapon from a weapons cache in, for example, a video game or a military training simulator.

A manipulandum representing a trigger according to an embodiment of the invention can allow a user to employ various weapons in a video game environment without having to use a separate manipulandum to cycle through available weapons options. Alternatively, a separate manipulandum can be employed to cycle through weapons, and the trigger can only have a single level. In this embodiment, the trigger can play a continuous output or a single-shot output depending on the weapon selected in the video game environment. The trigger can have haptic feedback that indicates to the user that the weapon is being fired in the simulation or in the video game. The feedback can be based on a continuous time-based waveform that is played from a controller based on a position signal. In one embodiment, a first predetermined time-based waveform can include discontinuities that have a high value of resistive force, making the trigger seem difficult to depress to a user. In another embodiment, the trigger can be very easily depressed, for example, when the user's character in a video game is using a gun with a hair-pin trigger.

In yet another embodiment of the invention, the button can be a button on a computer mouse, and can include multiple functions associated with each level of the button. For example, a cut function can be associated with one level of a button on a computer mouse according to an embodiment of the invention. Other functions can be associated with various other functions that are typically performed within a graphical user interface. For example, a multi-level button according to an embodiment of the invention can include levels associated with a copy function, a past function, and a cut function for performing various operations on text or images within a graphical user interface.

In yet another embodiment of a knob/button combination, a computer mouse can include a scroll wheel for scrolling through windows in a graphical user interface. For example, the scroll wheel can include various detents in the same manner as knob 1000. As the scroll wheel is rotated, a controller can play a predetermined time-based waveform that can be felt by a user. In yet another embodiment, the scroll wheel can include a multi-level button that can include any number of web-browser functions. For example, the scroll wheel can also operate as a multi-level button that includes a level for a "back" web browser function, a "forward" web browser function, a "stop" browser function, and a "refresh" browser function. Any number of other web browser functions can be included in a computer peripheral device according to an embodiment of the invention.

Alternatively, a button and a haptic knob may be combined. A button can be used to select different position-based profiles to be output by the knob, as disclosed in U.S. Pat. No. 6,154,201, which is hereby incorporated by reference in its entirety. The button/knob combination can be used for example, in a car stereo. The button can be depressed to select different stereo functions, for example, tuning and volume control. In one embodiment, the tuning control can have a first position-based component including a first detent profile, and the volume control can have a second position-based component including a second detent profile. The tuning control can have a predetermined time-based component associated with a threshold position. The volume control can have a different predetermined time-based component than the predetermined time-based component associated with the tuning control. Alternatively, the predetermined time-based components for the volume control and the tuning control can be the same. In one embodiment, the threshold positions for the, for example, tuning control and the volume control can be the same. Alternatively, the threshold positions for the, for example, tuning control and the volume control can be different. In yet another embodiment, the button portion of the manipulandum can be a multi-level button having haptic feedback including a predetermined time-based component associated with each level and a position-based component.

While various embodiments of the invention have been described above, it should be understood that they have been presented by way of example only, and not limitation. Thus, the breadth and scope of the invention should not be limited by any of the above-described embodiments including predetermined time-based waveforms, examples of manipulandums, or particular position-based components of the haptic feedback, but should be defined only in accordance with the following claims and their equivalence.

The previous description of the embodiments is provided to enable any person skilled in the art to make or use the invention. While the invention has been particularly shown and described with reference to embodiments thereof, it will be understood by those skilled in art that various changes in form and details can be made therein without departing from the spirit and scope of the invention. For example, a manipulandum having haptic feedback which is based one a predetermined time-based component and a position based component may be used in, for example, cell phones, automobiles, joysticks, light switches, lighting dimmers, dials, key boards, drills, personal digital assistants (PDAs), photocopiers, multiple degree-of-freedom devices, or any other device having a manipulandum configured to be manipulated by a user.

We claim:
1. An apparatus, comprising:
a manipulandum;
a sensor configured to sense movement of the manipulandum between a first position and a second position of a detent, wherein the sensor is configured to output a positional signal when the manipulandum is sensed moving from the first position to the second position; and an actuator configured to output a first haptic feedback force to the manipulandum in response to the positional signal indicating the manipulandum moving between the first position and the second position, wherein the first haptic feedback force corresponds to a position based force signal, the actuator configured to output a second haptic feedback force to the manipulandum only once in response to the positional signal indicating the manipulandum at a threshold position between the first and second positions, the second haptic feedback force including the position based force signal and a predetermined time-based force signal.

2. The apparatus of claim 1, wherein the manipulandum is a rotatable knob.

3. The apparatus of claim 1, wherein the predetermined time-based force signal comprises a single time-based waveform.

4. The apparatus of claim 1, wherein the predetermined time-based force signal comprises a plurality of time-based waveforms.

5. The apparatus of claim 1, wherein the predetermined time-based force signal is represented by at least one of: a saw tooth wave, a square wave, a pulse, a full sine wave, a half sine wave, or a triangle wave.

6. The apparatus of claim 1, wherein the manipulandum is a depressible button of a communication device.

7. The apparatus of claim 1, wherein the manipulandum is a depressible button of a video game controller.

8. The apparatus of claim 1, wherein the manipulandum is a depressible button of a computer mouse.

9. A method for outputting haptic sensation, comprising:
sensing movement of a manipulandum between a first position and a second position of a detent;
outputting a position-based force signal to an actuator coupled to the manipulandum, the position-based force signal associated with the manipulandum being sensed from the first position to the second position;
outputting a first haptic feedback force via the actuator upon receiving the position-based force signal when the manipulandum is moving between the first and second positions; and
outputting a second haptic feedback force via the actuator only once upon sensing the manipulandum at a threshold position between the first and second positions, the second haptic feedback including a predetermined time-based force signal.

10. The method of claim 9, wherein the second haptic feedback force includes the position-based force signal.

11. The method of claim 9, wherein the predetermined time-based force signal is associated with a predetermined time-based waveform.

12. The method of claim 9, further comprising:
outputting a biasing force configured to oppose movement of the manipulandum from the first position to the second position.

13. The method of claim 9, further comprising:
accessing the predetermined time-based force signal stored within a processor-readable medium in response to sensing the manipulandum at the threshold position.

14. The method of claim 9, further comprising:
outputting a biasing force configured to oppose the manipulandum being moved from the first position to the second position using a virtual spring.

15. The method of claim 9, further comprising:
outputting a biasing force configured to oppose the manipulandum being moved from the first position to the second position using a physical spring.

16. The method of claim 9, further comprising:
outputting a biasing force configured to oppose the manipulandum being moved from the first position to the second position; and
outputting a third haptic feedback force in response to sensing the manipulandum being moved from the second position to the first position.

17. The method of claim 9, further comprising:
determining a velocity at which the manipulandum is moved between the first and second positions; and
modifying a characteristic of the first haptic feedback force in response to the velocity of the manipulandum.

18. The method of claim 9, wherein the predetermined time-based force signal includes a plurality of predetermined time-based waveforms.

19. The method of claim 9, wherein the predetermined time-based force signal includes a single predetermined time-based waveform.

20. The method of claim 9, wherein the predetermined time-based force signal has a period in a range of about 1 ms to about 300 ms.

21. The method of claim 9, further comprising:
selecting a predetermined time-based waveform associated with the predetermined time-based force signal; and
inputting a signal associated with the selected predetermined time-based waveform into a controller, the controller configured to control the actuator based on the signal associated with the selected predetermined time-based waveform when the manipulandum is disposed at the threshold position.

22. The method of claim 9, further comprising:
outputting a hysteresis effect when the manipulandum is disposed at the threshold position.

23. A method for outputting haptic sensation, comprising:
sensing movement of a rotatable knob between a first position and a second position of a detent;
outputting a position-based force signal to an actuator coupled to the knob, the position-based force signal associated with the manipulandum being sensed from the first position to the second position;
outputting a first haptic feedback force via the actuator upon receiving the position-based force signal when the knob is rotating between the first and second positions; and
outputting a second haptic feedback force via the actuator only once upon sensing the knob at a threshold position between the first and second positions, the second haptic feedback including a predetermined time-based force signal.

* * * * *